(12) United States Patent
Ikeuchi et al.

(10) Patent No.: US 8,079,967 B2
(45) Date of Patent: Dec. 20, 2011

(54) CONTROLLER FOR WALKING ASSISTANCE DEVICE

(75) Inventors: Yasushi Ikeuchi, Wako (JP); Tatsuya Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1090 days.

(21) Appl. No.: 11/912,561

(22) PCT Filed: May 29, 2006

(86) PCT No.: PCT/JP2006/310655
§ 371 (c)(1),
(2), (4) Date: Oct. 25, 2007

(87) PCT Pub. No.: WO2006/126708
PCT Pub. Date: Nov. 30, 2006

(65) Prior Publication Data
US 2009/0048686 A1    Feb. 19, 2009

(30) Foreign Application Priority Data

May 27, 2005 (JP) ................... 2005-155329
May 31, 2005 (JP) ................... 2005-158516
Jul. 27, 2005 (JP) ................... 2005-216635
Apr. 28, 2006 (JP) ................... 2006-125224

(51) Int. Cl.
*A61H 1/00* (2006.01)
*A61F 5/00* (2006.01)

(52) U.S. Cl. ................. 601/5; 601/23; 601/27; 601/34; 601/35

(58) Field of Classification Search ............... 601/5, 34, 601/35, 36, 27; 602/23, 26, 27
See application file for complete search history.

(56) References Cited

U.S. PATENT DOCUMENTS 1,660,721 A * 2/1928 Schrag .................. 602/16
3,358,678 A * 12/1967 Kultsar ................ 601/23
4,543,948 A * 10/1985 Phillips et al. ........... 602/23
(Continued)

FOREIGN PATENT DOCUMENTS
DE    44 08 351    9/1994
(Continued)

*Primary Examiner* — Justine Yu
*Assistant Examiner* — Clinton T Ostrup
(74) *Attorney, Agent, or Firm* — Rankin, Hill & Clark LLP

(57) ABSTRACT

A walking assistance device (1) has a receiving portion (2) which receives a part of the weight of a user (A) applied from above and a pair of left and right leg links (3R, 3L) connected to the receiving portion (2) through first joints (10R, 10L), with foot attachment portions (15R, 15L) at lower ends of the leg links (3R, 3L) attached to the feet of the legs of the user (A), respectively. The leg links (3R, 3L) are connected to the receiving portion (2) in such a way that, when each leg of the user (A) is a standing leg, a line of action of a supporting force transmitted from a third joint (14R, 14L) of the leg link (3R, 3L) to a crus frame (13R, 13L) out of the supporting force acting on the leg link (3R, 3L) from the floor side passes through a specific point (P) located upper than the receiving portion (2) within an anteroposterior width of a contact surface between the receiving portion (2) and the user (A) from the third joint (14R, 14L), viewed in the sagittal plane. Thereby, it is possible to stably apply a desired lifting force for reducing the weight to be borne by the user with his/her legs to the user.

12 Claims, 15 Drawing Sheets

U.S. PATENT DOCUMENTS

| | | |
|---|---|---|
| 4,872,665 A | 10/1989 | Chareire |
| 5,020,790 A | 6/1991 | Beard |
| 5,282,460 A * | 2/1994 | Boldt .................................. 601/5 |
| 7,278,954 B2 * | 10/2007 | Kawai et al. ........................ 482/1 |
| 7,524,297 B2 * | 4/2009 | Shimada et al. ................ 602/16 |
| 7,628,766 B1 * | 12/2009 | Kazerooni et al. .............. 602/16 |

FOREIGN PATENT DOCUMENTS

| | | |
|---|---|---|
| FR | 2 802 801 | 6/2001 |
| GB | 2 278 041 | 11/1994 |
| JP | 05-329186 | 12/1993 |
| JP | 06-079657 | 3/1994 |
| JP | 07-112035 | 5/1995 |
| JP | 2000232999 A * | 8/2000 |
| JP | 2000233000 A * | 8/2000 |
| JP | 2002126021 A * | 5/2002 |
| JP | 2003-220102 | 8/2003 |
| JP | 2004-236998 | 8/2004 |
| JP | 2005-013534 | 1/2005 |
| WO | 01/19461 | 3/2001 |

\* cited by examiner

CONTROLLER FOR WALKING ASSISTANCE DEVICE

TECHNICAL FIELD

The present invention relates to a walking assistance device for assisting a user (person) in walking.

BACKGROUND ART

Conventionally, as this type of walking assistance device, there is known one shown in FIG. 4 of Japanese Patent Laid-Open No. Hei 7 (1995)-112035 (hereinafter, referred to as Patent Document 1), for example. The walking assistance device shown in FIG. 4 of Patent Document 1 has a pair of left and right leg links extending from a frame carried on back of the user's body and foot members at the lower ends of the leg links are attached to the user's feet. It then intends that a saddle-shaped support member extended from the frame to the user's crotch supports a part of the user's weight. Each leg link has a first joint (corresponding to a hip joint) relatively closer to the frame, a second joint (corresponding to a knee joint) in a middle portion, and a third joint (corresponding to an ankle joint) at the lower end.

DISCLOSURE OF THE INVENTION

In the walking assistance device having the structure as shown in FIG. 4 of Patent Document 1, the first joints of the leg links are provided on the user's dorsal side. Therefore, for example, even if it is attempted that a part of the user's weight is supported by driving only the second joint of each leg link using an actuator, a couple occurs due to an upward force applied to the frame on the user's dorsal side and a downward force applied to the support member from the user. Then, the couple causes the support member to incline forward and downward. This easily causes a displacement of the user's contact position with respect to the support member and therefore it is practically impossible to cause the user to apply a desired lifting force stably while supporting a part of the user's weight. The above couple can be canceled by driving the first joint. In that case, however, there is a need for a complicated coordinated control of the actuators for the first joint and the second joint of each leg link. In addition, when the lifting force is applied to the user from the support member by the walking assistance device disclosed in Patent Document 1, the lifting force is divided between the left and right leg links. The walking assistance device of Patent Document 1, however, does not have a technology to appropriately divide the lifting force between the leg links. Therefore, there has been a possibility that a force which does not match the movement of each leg of the user is applied to the corresponding leg.

The present invention has been provided in view of the above background, and therefore it is an object of the present invention to provide a walking assistance device capable of stably applying a desired lifting force for reducing a weight that should be borne by the user with his/her legs to the user. Furthermore, it is another object of the present invention to provide a walking assistance device capable of appropriately dividing the lifting force between the leg links corresponding to the user's legs.

To achieve the above objects, according to a first invention of the present invention, there is provided a walking assistance device having: a receiving portion disposed between the root of both legs of a user so as to receive a part of the weight of the user from above; a pair of left and right thigh frames respectively connected to the receiving portion through first joints; a pair of left and right crus frames respectively connected to the thigh frames through second joints; a pair of left and right foot attachment portions that are respectively connected to the crus frames through third joints and respectively attached to the feet of the left and right legs of the user and that come in contact with the ground when the legs of the user are standing legs; an actuator for the left which drives the second joint among the joints of the left leg link composed of the first joint, the thigh frame, the second joint, the crus frame, the third joint, and the foot attachment portion on the left side; and an actuator for the right which drives the second joint among the joints of the right leg link composed of the first joint, the thigh frame, the second joint, the crus frame, the third joint, and the foot attachment portion on the right side; the second joints of the leg links being driven by the actuators so that upward lifting forces are applied to the user from the receiving portion, wherein: each leg link is connected to the receiving portion so that a line of action of a supporting force applied to the crus frame from the third joint of each leg link corresponding to the leg when each leg of the user is a standing leg passes through a predetermined point located upper than the receiving portion within the anteroposterior width of a contact surface between the receiving portion and the user from the third joint, when the leg link is viewed in the sagittal plane of the user; and the walking assistance device comprises means which applies the lifting forces to the user by controlling the actuators so that forces to be controlled reach predetermined desired values for the respective leg links with the supporting forces as the forces to be controlled.

According to the first invention, the supporting force (vector) transmitted from the third joint of each leg link to the crus frame is generated from the third joint toward the predetermined point located upper than the receiving portion within the anteroposterior width of the contact portion between the receiving portion and the user. Therefore, it is possible to sufficiently reduce a difference between a line of action (a vertical line which passes through the center of gravity of a load distributed over the contact surface between the user and the receiving portion) of a load (a gravity corresponding to a part of the weight of the user) applied to the receiving portion from the user and a line of action of a supporting force applied to the crus frame from the third joint of each leg link. In other words, it is possible to sufficiently reduce a couple which occurs in the receiving portion due to the load applied to the receiving portion from the user and the supporting force applied to the crus frame from the third joint of each leg link. As a result, the position or posture of the receiving portion with respect to the user can be stabilized. Then, the supporting force from the third joint of each leg link toward the predetermined point is to be controlled as described above in the present invention. Further, the lifting force is applied to the user by driving each of the actuators so that the force to be controlled reaches the predetermined desired value for each leg link. Thereby, the required lifting force can be applied to the user stably.

In the present invention, the supporting force (vector) applied to the crus frame from the third joint of each leg link corresponds to a share for each leg link out of the total supporting force for supporting the total sum of a part of the weight of the user (the weight supported by the lifting force applied to the user from the receiving portion) and the weight (the weight is substantially equal to the weight of the entire walking assistance device in general) obtained by subtracting the weight of the portions (the foot attachment portions and the like) located below the third joint of each of the left and right leg links from the weight of the entire walking assistance device on the floor.

In the first invention, more specifically, the first joint of each leg link is preferably a joint that connects the thigh frame of the leg link and the receiving portion in such a way that the leg link is free to swing at least in the forward/backward direction with the predetermined point as a swing central point (the second invention).

Alternatively, preferably the first joint of each leg link is a joint that connects the thigh frame of the leg link and the receiving portion in such a way that the leg link is free to swing in the forward/backward direction and in the left/right direction and at least the forward/backward swing central point of the leg link is located above the receiving portion as the predetermined point (the third invention).

According to the second and third inventions, the supporting force applied to the crus frame from the third joint of each leg link is a vector from the third joint of the leg link toward the swing central point in the forward/backward direction (namely, the predetermined point) of the thigh frame of the leg link. The swing central point in the forward/backward direction of the leg link (hereinafter, referred to as forward/backward swing central point in this section) is located upper than the receiving portion within the anteroposterior width of the contact surface between the receiving portion and the user, when viewed in the sagittal plane. Therefore, for example, if the receiving portion inclines forward and downward since the line of action of the load from the user to the receiving portion shifts forward of the forward/backward swing central point due to a forward tilting of the upper body of the user or the like, the point of action of force from the user to the receiving portion is displaced backward under the forward/backward swing central point. Eventually, the position and posture of the receiving portion is automatically to converge to a state where the line of action of the load from the user to the receiving portion passes through the forward/backward swing central point. Further, in the state where the line of action of the load from the user to the receiving portion passes through the forward/backward swing central point, a couple does not occur due to the load and the supporting force transmitted from the third joint of each leg link to the crus frame, and therefore the position of the receiving portion with respect to the user is stabilized. As described above, according to the second invention or the third invention, it is possible to prevent a displacement of the receiving portion with respect to the user. Eventually, the lifting force from the receiving portion to the user can be stabilized. In the third invention, the swing central point in the left/right direction of the leg link can be located either upper or lower than the receiving portion.

Supplementarily, in the second invention, the first joint is formed as described below, for example. Specifically, a pair of left and right arc-shaped or elliptic arc-shaped (shaped in a part of the periphery of an oval shape) guide rails are connected to the receiving portion in such a way that the center of the arc is located above the receiving portion. Further, the thigh frame of each leg link is supported by the guide rail so as to swing along the guide rail, by which the first joint can be formed. Moreover, in the third invention, for example, the guide rail is connected to the receiving portion via a pivot pin in the anteroposterior direction, so that the guide rail around the central axis of the pivot pin can swing freely. Thereby, the first joint in the third invention can be formed.

Moreover, in the first to third inventions, preferably the actuator for the left and the actuator for the right are provided with being connected to the thigh frames at places closer to the receiving portion than the second joints, respectively, and the walking assistance device further includes a pair of left and right power transmission means which transmit driving forces of the actuators to the second joints, respectively (the fourth invention).

According to the fourth invention, the actuators having relatively large weights are provided at the places closer to the receiving portion, and therefore, an inertial force accompanying the actuator motion of a free leg can be reduced in walking of the user equipped with the walking assistance device. Therefore, a load on the user can be reduced. The power transmission means can be a wire, a rod, or a tube or shaft through which a fluid passes.

In the first to fourth inventions, regarding the control of the force to be controlled, more specifically, it is preferable that the walking assistance device comprises: treading force measuring means which measures a treading force of each leg of the user on the basis of a force detected value indicated by an output of a first force sensor provided in each of the foot attachment portions; desired lifting force setting means which sets a desired lifting force, which is a desired value of an upward lifting force to be applied to the user from the receiving portion; a second force sensor which is inserted between a lower end of the crus frame of each leg link and the third joint thereof or between the third joint of each leg link and the foot attachment portion thereof; force-to-be-controlled measuring means which measures the supporting force actually applied to the crus frame from the third joint of each leg link as a force to be controlled on the basis of the force detected value indicated by an output of the second force sensor; total desired lifting force determining means which determines the total sum of the desired lifting force and a supporting force for supporting the weight obtained by subtracting the total weight of the portions below the second force sensors from the weight of the entire walking assistance device out of the walking assistance device on the floor or the total sum of the desired lifting force and a supporting force for supporting the weight of the entire walking assistance device on the floor as the total desired lifting force; distribution means which determines a desired share for the left leg link and a desired share for the right leg link out of the total desired lifting force by distributing the total desired lifting force to the leg links on the basis of the ratio between the treading force of the left leg and the treading force of the right leg of the user; and actuator control means which controls the actuator for the left so that a difference between the force to be controlled for the left leg link and the desired share therefor approaches zero on the basis of the force to be controlled for the left leg link and the desired share for the left leg link and which controls the actuator for the right so that a difference between the force to be controlled for the right leg link and the desired share therefor approaches zero on the basis of the force to be controlled for the right leg link and the desired share for the right leg link (the fifth invention).

According to the fifth invention, the total sum of the desired lifting force set by the desired lifting force setting means and the supporting force for supporting the weight (hereinafter, the weight is referred to as weight X in this section) obtained by subtracting the total weight of the portions below the second force sensors out of the walking assistance device from the weight of the entire walking assistance device on the floor or the total sum of the desired lifting force and a supporting force for supporting the weight of the entire walking assistance device on the floor is determined as the total desired lifting force. This total desired lifting force means a supporting force necessary to support the total sum of the load applied to the receiving portion from the user (a force which is balanced with the lifting force) and the gravity corresponding to the weight X of the walking assistance device or the weight of the entire walking assistance device on the floor with the both or one of the leg links. The weight X of the walking assistance device substantially equals the weight of the entire walking assistance device in general.

Furthermore, in the fifth invention, the total desired lifting force is distributed according to the ratio between the treading force of the right leg and the treading force of the left leg of the user measured by the treading force measuring means. This determines the desired share for the left leg link and the desired share for the right leg link out of the total lifting force. In this case, the ratio between the treading force of the right leg and the treading force of the left leg of the user measured by the treading force measuring means reflects an intention of how the user is to support the weight of the user himself/herself with the legs on the floor. For example, if the treading force of the left leg is larger than the treading force of the right leg, the user is to support his/her weight mainly with the right leg. Therefore, it is possible to distribute the desired lifting force to the leg links so as to fit in with the operating state of each leg that the user wishes. In other words, the ratio between the desired share for the right leg link and the desired share for the left leg link can be determined in accordance with the ratio between the treading force of the right leg and the treading force of the left leg that reflect the operation of the legs which the user wishes. More specifically, for example, the desired lifting force share for the right leg link can be determined so that the ratio of the desired lifting force share for the right leg link with respect to the desired lifting force is equal to the ratio of the treading force of the right leg with respect to the total sum of the treading force of the right leg and the treading force of the left leg of the user. Moreover, the desired lifting force share for the left leg link can be determined so that the ratio of the desired lifting force share for the left leg link with respect to the desired lifting force is equal to the ratio of the treading force of the left leg with respect to the total sum of the treading force of the right leg and the treading force of the left leg of the user. Supplementarily, the desired share for the left leg link has a meaning of a desired value of the force to be controlled of the left leg link and the desired share for the right leg link has a meaning of a desired value of the force to be controlled of the right leg link.

Further, in the fifth invention, the actuator for the left is controlled so that the difference between the force to be controlled for the left leg link and the desired share therefor approaches zero on the basis of the force to be controlled for the left leg link measured by the force-to-be-controlled measuring means (the supporting force actually applied to the crus frame from the third joint of the left leg link) and the desired share for the left leg link determined by the distribution means. Similarly, the actuator for the right is controlled so that the difference between the force to be controlled for the right leg link and the desired share therefor approaches zero on the basis of the force to be controlled for the right leg link measured by the force-to-be-controlled measuring means (the supporting force actually applied to the crus frame from the third joint of the right leg link) and the desired share for the right leg link determined by the distribution means.

By controlling the actuators, the actual shares for the respective leg links can be reliably controlled to the desired shares. Additionally, at that time the actual lifting force applied to the user from the receiving portion can be controlled to the desired lifting force.

Thereby, in the fifth invention, the set desired lifting force can be appropriately applied to the user from the receiving portion while the total desired lifting force is distributed to the left and right leg links so as to fit in with the operating state of each leg intended by the user in consideration of the weight of the walking assistance device. As a result, the load on each leg of the user can be effectively reduced.

Further, in the first to fourth inventions, as a form other than that of the fifth invention, the walking assistance device can comprise: treading force measuring means which measures a treading force of each leg of the user on the basis of a force detected value indicated by an output of a first force sensor provided in each of the foot attachment portions; a second force sensor which is inserted between a lower end of the crus frame of each leg link and the third joint thereof or between the third joint of each leg link and the foot attachment portion thereof; force-to-be-controlled measuring means which measures the supporting force actually applied to the crus frame from the third joint of each leg link as a force to be controlled on the basis of the force detected value indicated by an output of the second force sensor; desired assist ratio setting means which sets a desired assist ratio which is a desired value of a ratio of a force to be assisted by the walking assistance device out of the total treading force which is the total sum of the treading forces of the legs of the user with respect to the total treading force; desired lifting force share determining means which determines a desired lifting force share that is a desired value of a share for the left leg link and a desired lifting force share that is a desired value of a share for the right leg link out of the upward lifting forces to be applied to the user from the receiving portion by multiplying the treading forces of the respective legs of the user by the desired assist ratio; distribution means which determines a share for the left leg link and a share for the right leg link out of the supporting force as desired device supporting force shares for the respective leg links by distributing a supporting force for supporting the weight, which is obtained by subtracting the total weight of the portions below the second force sensor out of the walking assistance device from the weight of the entire walking assistance device on the floor, or a supporting force for supporting the weight of the entire walking assistance device on the floor to the leg links according to the ratio between the treading force of the left leg of the user and the treading force of the right leg of the user; force-to-be-controlled desired value determining means which determines a total sum of the desired lifting force share for the left leg link and the desired device supporting force share therefor as a desired value of the force to be controlled of the left leg link and determines a total sum of the desired lifting force share for the right leg link and the desired device supporting force share therefor as a desired value of the force to be controlled of the right leg link; and actuator control means which controls the actuator for the left so that a difference between the force to be controlled for the left leg link and the desired value therefor approaches zero on the basis of the force to be controlled for the left leg link and the desired value of the force to be controlled for the left leg link and which controls the actuator for the right so that a difference between the force to be controlled for the right leg link and the desired value therefor approaches zero on the basis of the force to be controlled for the right leg link and the desired value of the force to be controlled for the right leg link (the sixth invention).

In the sixth invention, the desired lifting force share for the left leg link and the desired lifting force share for the right leg link are determined out of the upward lifting forces to be applied to the user from the receiving portion by multiplying the treading forces of the respective legs of the user, which have been measured by the treading force measuring means, by the desired assist ratio set by the desired assist ratio setting means. In other words, the desired lifting force share for the left leg link is determined by multiplying the measured treading force for the left leg of the user by the desired assist ratio, and the desired lifting force share for the right leg link is determined by multiplying the measured treading force for the right leg of the user by the desired assist ratio. The total sum of the desired lifting force share for the left leg link and the desired lifting force share for the right leg link corresponds to the desired value of the total lifting force applied to the user from the receiving portion. This is substantially balanced with the force obtained by multiplying the total treading force of the user by the desired assist ratio.

In this case, the treading force of the right leg and the treading force of the left leg of the user measured by the treading force measuring means reflect the intention of how the user is to support his/her weight with the legs on the floor, as described regarding the fifth invention. Therefore, the desired value of the total lifting force applied to the user from the receiving portion (the total sum of the desired lifting force shares of the respective leg links) can be distributed to the respective leg links so as to fit in with the operating state of each leg that the user wishes by determining the desired lifting force shares of the leg links as described above.

Further, in the sixth invention, the supporting force for supporting the weight obtained by subtracting the total weight of the portions below the second force sensors out of the walking assistance device from the weight of the entire walking assistance device on the floor (that is, the weight X) or a supporting force for supporting the weight of the entire walking assistance device on the floor is distributed to the leg links according to the ratio between the treading force of the left leg of the user and the treading force of the right leg of the user measured by the treading force measuring means. This determines the share for the left leg link and the share for the right leg link out of the desired value of the supporting force as the desired device supporting force shares for the respective leg links. In other words, the supporting force for supporting the weight X of the walking assistance device or the weight of the entire walking assistance device on the floor (which means a force balanced with the gravity corresponding to the weight X of the walking assistance device or the weight of the entire walking assistance device: hereinafter, the force is referred to as the device supporting force in this section) is distributed to the respective leg links in accordance with the ratio between the treading force of the right leg and the treading force of the left leg which reflects the operations of the legs intended by the user, by which the desired device supporting force shares for the leg links are determined. More specifically, for example, the desired device supporting force share for the right leg link can be determined in such a way that the ratio of the desired device supporting force share for the right leg link with respect to the desired value of the device supporting force is the same as the ratio of the treading force of the right leg with respect to the total sum of the treading force of the right leg and the treading force of the left leg of the user. Similarly, the desired device supporting force share for the left leg link can be determined in such a way that the ratio of the desired device supporting force share for the left leg link with respect to the desired value of the device supporting force is the same as the ratio of the treading force of the left leg with respect to the total sum of the treading force of the right leg and the treading force of the left leg of the user.

Further, in the sixth invention, the total sum of the desired lifting force share for the left leg link determined by the desired lifting force share determining means and the desired device supporting force share for the left leg link determined by the distribution means is determined as the desired value of the force to be controlled of the left leg link. Similarly, the total sum of the desired lifting force share for the right leg link determined by the desired lifting force share determining means and the desired device supporting force share for the right leg link determined by the distribution means is determined as the desired value of the force to be controlled of the right leg link. Supplementarily, the desired value of the force to be controlled of the left leg link and the desired value of the force to be controlled of the right leg link in the sixth invention correspond to the desired share for the left leg link and the desired share for the right leg link in the sixth invention, respectively.

Thereby, the desired value of the force to be controlled for each leg link is determined in accordance with the ratio between the treading force of the right leg and the treading force of the left leg which reflect the operations of the legs intended by the user. In this case, the desired value of the force to be controlled of each leg link is the sum of the desired lifting force share for the leg link and the desired device supporting force share therefor. Therefore, the total sum of the desired values of the forces to be controlled of the leg links corresponds to the total sum of the lifting force to be applied to the user from the receiving portion and the supporting force for supporting the weight X of the walking assistance device or the weight of the entire walking assistance device on the floor.

Further, in the sixth invention, the actuator for the left is controlled so that the difference between the force to be controlled for the left leg link and the desired value therefor approaches zero on the basis of the force to be controlled for the left leg link measured by the force-to-be-controlled measuring means and the desired value of the force to be controlled for the left leg link determined by the force-to-be-controlled desired value determining means. Similarly, the actuator for the right is controlled so that the difference between the force to be controlled for the right leg link and the desired value therefor approaches zero on the basis of the force to be controlled for the right leg link measured by the force-to-be-controlled measuring means and the desired value of the force to be controlled for the right leg link determined by the force-to-be-controlled desired value determining means.

This provides a reliable control of the actual force to be controlled for each leg link (the actual force to be controlled corresponds to the load (a force balanced with the upward lifting force actually applied to the user from the receiving portion) actually applied to the receiving portion from the user and the actual share for each leg link with respect to the total supporting force for supporting the weight X of the walking assistance device or the weight of the entire walking assistance device) to the desired value. Moreover, in this state, the actual lifting force applied to the user from the receiving portion can be controlled to the lifting force corresponding to the force obtained by multiplying the total treading force of the user by the desired assist ratio.

Thereby, in the sixth invention, while distributing the lifting force which supports the weight obtained by multiplying the total weight of the user by the desired assist ratio to the left and right leg links in such a way as to fit in with the operating states of the legs intended by the user in consideration of the weight of the walking assistance device, the lifting forces can be appropriately applied to the user from the receiving portion. As a result, the loads on the legs of the user can be reduced more effectively.

Therefore, according to the sixth invention, it is possible to reduce the forces that should be supported by the user on the floor with his/her legs with the portions attached to the legs of the user reduced and to distribute the assisting force (lifting force) for the reduction to the leg links corresponding to the legs of the user appropriately.

Supplementarily, in the first to sixth inventions described above, the receiving portion can be, for example, a portion where the user sits astride the seat member (the user sits on the seat member with the seat member located between the root ends of the legs of the user) (for example, a saddle-shaped portion). In this case, the first joint of each leg link is preferably provided below the receiving portion. Moreover, preferably the first joint of each leg link has a degree of freedom of rotation around two axes which allows not only, for example, the swing motion in the forward/backward direction of the leg links, but also adduction and abduction of the leg links. Further, the first joint can be a joint having a degree of freedom of rotation around three axes which allows the rotary motion of each leg link around a vertical axis. In addition, the second joint of each leg link can be, for example, a joint having a degree of freedom of rotation around one horizontal axis, but can be a translatory joint. Moreover, the third joint of each leg link is preferably a joint having a degree of freedom of rotation around three axes, but can be a joint having a degree of freedom of rotation around two axes including a pitch direction. In addition, the foot attachment portion of each leg link is preferably provided with, for example, an annular member into which the foot of the user wearing the foot attachment portion is inserted from its toe side and it is preferably connected to the third joint of the leg link through the annular member.

Further, for example, when each leg of the user is a standing leg, the first force sensor of the foot attachment portion is mounted on the foot attachment portion so as to be located between the sole of foot of the standing leg and the floor. Alternatively, for example, if the foot attachment portion of each leg link has the annular member, the foot supporting member which supports the foot of the user is disposed inside the annular member in such a way that it is not in contact with the annular member. Then, the foot supporting member is suspended in the annular member through the first force sensor.

BEST MODE FOR CARRYING OUT THE INVENTION

A first embodiment of the present invention will be described below with reference to the accompanying drawings. The first embodiment corresponds to the first to fifth inventions of the present invention.

First, the structure of a walking assistance device according to this embodiment will be described below with reference to FIG. 1 to FIG. 3. FIG. 1 is a side view of the walking assistance device; FIG. 2 is a view on arrow taken along line II in FIG. 1; and FIG. 3 is a sectional view taken along line III-III shown in FIG. 1. The walking assistance device 1 in FIG. 1 to FIG. 3 is shown in a condition where it is mounted on a user A (indicated by a virtual line) with being operated. In this case, the shown user A is standing in a substantially upright posture. Note that, however, the user A is in a stance with his/her legs apart so that the structure of the walking assistance device 1 can be easily understood.

Referring to FIG. 1 and FIG. 2, the walking assistance device 1 is a weight relief assist device which supports a part of the weight of the user A (which reduces the weight supported by the user with his/her own legs (standing legs) to the level lower than his/her weight). The walking assistance device 1 has a seat member 2 which the user A sits on and a pair of left and right leg links 3L and 3R connected to the seat member 2. The leg links 3L and 3R have the same structure as each other. In FIG. 1, the leg links 3L and 3R are arranged side by side with each other in the left/right direction (in the direction perpendicular to the paper surface of FIG. 1) in the same posture. In this state, the legs are overlapped on the drawing (the left leg link 3L is located on the front side of the figure).

In the description of the embodiments in this specification, a reference "R" is used to indicate a thing related to the right leg of the user A or to the right leg link 3R of the walking assistance device 1 and a reference "L" is used to indicate a thing related to the left leg of the user A or to the left leg link 3L of the walking assistance device 1. Note that, however, the references R and L are often omitted if there is no need to particularly distinguish between left and right.

The seat member 2 is saddle-shaped and the user A can sit on the top surface (bearing surface) of the seat member 2 in such a way as to straddle the seat member 2 (so that the seat member 2 is disposed between the root ends of the legs of the user A). This sitting applies a part of the weight of the user A to the seat member 2 from thereabove. The seat member 2 corresponds to the receiving portion in the present invention.

A front end $2f$ and a rear end $2r$ of the seat member 2 are protruding upward as shown in FIG. 1 and thereby the sitting position (the position in the anteroposterior direction) of the user A with respect to the seat member 2 is limited to between the front end $2f$ and the rear end $2r$ of the seat member 2. The front end $2f$ of the seat member 2 is formed in a furcate shape as shown in FIG. 2.

Each leg link 3 includes a thigh frame 11 connected to the lower surface of the seat member 2 through a first joint 10, a crus frame 13 connected to the thigh frame 11 through a second joint 12, and a foot attachment portion 15 connected to the crus frame 13 through a third joint 14.

The first joint 10 of each leg link 3 is a joint which corresponds to a hip joint of the user A and can make a swing motion around the axis in the left/right direction of the leg link 3 (a swing motion in the anteroposterior direction of the leg link 3) and a swing motion around the axis in the anteroposterior direction (the adduction or abduction motions). The first joint 10, which is disposed below the seat member 2, includes a pair of pivot pins $20f$ and $20r$ disposed coaxially with each other on a central axis C in the anteroposterior direction indicated by a chain line shown in FIG. 1 in a front-side position and at the rear end, brackets $21f$ and $21r$ pivotally supported by the pivot pins $20f$ and $20r$, respectively, so as to be free to rotate, an arc-shaped guide rail 22 which is fixed to the lower end of the brackets $21f$ and $21r$, and a plate movably supported by the guide rail 22 along the guide rail 22. The thigh frame 11 is then extended from the plate 23 diagonally forward and downward. The thigh frame 11 is an approximately rod-shaped member and formed integrally with the plate 23.

The pivot pins $20f$ and $20r$ are fixed to the seat member 2 through bearings $24f$ and $24r$, which are fixed to the bottom surface of the seat member 2 at both ends (at the front end and the rear end). The bracket $21f$ is fit to the outer periphery of the middle portion of the pivot pin $20f$ at its upper end and pivotally supported by the pivot pin $20f$ so as to rotate freely around the central axis C of the pivot pin $20f$. Similarly, the bracket $21r$ is fit to the outer periphery of the middle portion of the pivot pin $20r$ at its upper end and pivotally supported by the pivot pin $20r$ so as to rotate freely around the central axis C of the pivot pin $20r$. Therefore, the guide rail 22 of each first joint 10 swings with the central axis C of the pivot pins $20f$ and $20r$ as a rotation axis together with the brackets $21f$ and $21r$. In this embodiment, the first joints 10R and 10L of the leg links 3R and 3L use the rotation axis C in common, and the first joint 10R of the leg link 3R and the first joint 10L of the leg link 3L use the pivot pins 20f and 20r in common. In other words, both of the bracket 21fR of the right first joint 10R and the bracket 21fL of the left first joint 10L are pivotally supported by the common pivot pin 20f, and both of the bracket 21fR of the right first joint 10R and the bracket 21rL of the left first joint 10L are pivotally supported by the common pivot pin 20r.

The plate 23 of the first joint 10 of each leg link 3 is disposed adjacent to the guide rail 22 in a posture parallel to a surface including an arc of the guide rail 22. As shown in FIG. 1, a carrier 26 having a plurality of (for example, four) rotatable rollers 25 is fixed to the plate 23. The rollers 25 of the carrier 26 are engaged with the upper surface (inner peripheral surface) and the lower surface (outer peripheral surface) of the guide rail 22 by the same number so as to freely roll. This allows the plate 23 to move freely along the guide rail 22. In this case, the positional relationship between the guide rail 22 and the seat member 2 and the radius of the arc of the guide rail 22 are set so that the central point of the arc of the guide rail 22 exists above the seat member 2 within the width of the contact surface between the seat member 2 and the user A in the anteroposterior direction when the walking assistance device 1 is viewed in the sagittal plane as shown in FIG. 1. The central point P corresponds to the predetermined point of the present invention.

According to the configuration of the first joint 10 described above, the thigh frame 11 integrated with the plate 23 can freely swing around the rotation axis C in the anteroposterior direction of the user A. This swing motion allows each leg link 3 to make the adduction/abduction motions. The thigh frame 11 integrated with the plate 23 is free to swing around a horizontal axis passing through the central point (predetermined point) P (more accurately, around the axis perpendicular to the surface including the arc of the guide rail 22 and passing through the central point P). This swing motion allows the leg links 3 to swing back and forth. In this embodiment, the first joint 10 can make rotary motions around two axes in the anteroposterior and horizontal directions. Alternatively, however, the first joint can be made so that it can make a rotary motion around the vertical axis (internal/external rotation motion) (in other words, so that it can make rotary motions around three axes). Alternatively, the first joint can be a joint which can make a rotary motion only around one horizontal axis (a joint of each leg link 3 capable of only the forward/backward swing motion).

Furthermore, the plate 23 of the first joint 10 of each leg link 3 extends from the location of the carrier 26 toward the backward of the seat member 2 when the walking assistance device 1 is viewed in the sagittal plane as shown in FIG. 1. Moreover, at the rear end of the plate 23, an electric motor 27 and a rotary encoder 28 as rotation angle detection means which detects a rotation angle (rotation angle from a predetermined reference position) of a rotor of the electric motor 27 are attached to the plate 23 coaxially with each other. In this embodiment, the second joint 12 of the first to third joints 10, 12, and 14 of each leg link 3 is driven and the above electric motor 27 is an actuator which drives the second joint 12. In addition, the rotary encoder 28 has a function of a displacement sensor which detects a displacement (rotation angle) of the second joint 12. The rotation angle detected by the rotary encoder is used to measure a rotation angle (bending angle) of the second joint 12. An electric motor 27L of the left leg link 3L and an electric motor 27R of the right leg link 3R correspond to the actuator for the left and the actuator for the right of the present invention, respectively. Each actuator can be a hydraulic or pneumatic actuator. In addition, each actuator can be fixed to, for example, the rear part of the seat member 2 through an appropriate bracket. Alternatively, each actuator can be attached to the second joint 12 of each leg link 3 so as to drive the second joint 12 directly. Furthermore, the displacement sensor which detects the displacement of the second joint 12 can be directly attached to the second joint 12 of each leg link 3. Moreover, the displacement sensor can be a potentiometer or the like, instead of the rotary encoder.

The second joint 12 of each leg link 3 is a joint which corresponds to a knee joint of the user A and allows stretching and bending motions of the leg link 3. The second joint 12 connects the lower end of the thigh frame 11 to the upper end of the crus frame 13 through a pivot pin 29 having a central axis in the horizontal direction (more accurately, a central axis perpendicular to the surface including the arc of the guide rail 22) so that the crus frame 13 is relatively rotatable with respect to the thigh frame 11 around the central axis of the pivot pin 29. The second joint 12 is provided with a stopper, which is not shown, to limit the rotatable range of the crus frame 13 with respect to the thigh frame 11.

The crus frame 13 of each leg link 3 is an approximately rod-shaped member extending diagonally downward from the second joint 12 of the leg link 3. More specifically, the crus frame 13 is formed by connecting a lower crus frame 13b which forms a part closer to the third joint 14 to a rod-shaped upper crus frame 13a which forms a part above the lower crus frame 13b with a force sensor 30 (which corresponds to the second force sensor in the present invention) interposed therebetween. The lower crus frame 13b is sufficiently shorter than the upper crus frame 13a. Thereby, the force sensor 30 is disposed in the vicinity of the third joint 14. The force sensor 30 is known and described as a Kistler sensor (registered trademark) and it is a three-axis force sensor which detects translational forces of three axes (a translational force in the axial direction perpendicular to the surface of the force sensor 30 and translational forces in two axial directions that are parallel to the surface of the force sensor 30 and that are orthogonal to each other). In this embodiment, however, only the detected values of the translational forces of two axes out of the detected translational forces of three axes are used as described later. Therefore, the force sensor 30 can be formed of a two-axis force sensor used to detect translational forces of two axes.

A pulley 31 which is rotatably integral with the crus frame 13 around the pivot pin 29 of the second joint 12 is secured to the upper end of the upper crus frame 13a of the crus frame 13. The ends of a pair of wires 32a and 32b serving as driving force transmission means which transmits a rotational driving force of the electric motor 27 to the pulley 31 are secured to the outer periphery of the pulley 31. The wires 32a and 32b are drawn out in the tangential direction of the pulley 31 from two places opposing the diameter of the outer periphery of the pulley 31. The wires 32a and 32b pass through a rubber tube (a protecting tube for the wires), which is not shown, laid along the thigh frame 11 and connected to a rotary drive shaft (not shown) of the electric motor 27. In this case, the electric motor 27 applies tensions to these wires 32a and 32b so that one of the wires 32a and 32b is rewound by the pulley 31 while the other is drawn out of the pulley 31 when the rotary drive shaft of the electric motor 27 rotates in the forward direction, and one of the wires 32a and 32b is rewound by the pulley 31 while the other is drawn out of the pulley 31 when the rotary drive shaft of the electric motor 27 rotates in the reverse direction. Thus, the rotary driving force of the electric motor 27 is transmitted to the pulley 31 through the wires 32a and 32b so as to rotationally drive the pulley 31 (the crus frame 13 to which the pulley 31 is secured rotates around the central axis of the pivot pin 29 of the second joint 12 relative to the thigh frame 11).

The lower end of the lower crus frame 13b of the crus frame 13 has a bifurcated portion 13bb formed in a bifurcated shape, as shown in FIG. 3.

The third joint 14 of each leg link 3 is a joint corresponding to an ankle joint of the user A. In this embodiment, the third joint 14 is composed of a free joint 33 (see FIG. 3) which permits rotations around three axes, as shown in FIG. 3, and the free joint 33 is attached to the bifurcated portion 13bb of the lower crus frame 13b of the crus frame 13 to connect the lower end (the bifurcated portion 13bb) of the crus frame 13 and a connecting portion 34 on the top of the foot attachment portion 15. This enables the foot attachment portion 15 to rotate with three degrees of freedom relative to the crus frame 13. The range of rotation of the foot attachment portion 15 around an axis in the anteroposterior direction is limited by the bifurcated portion 13bb of the crus frame 13.

The foot attachment portion 15 of each leg link 3 includes a shoe 35 which a foot of the user A is to be put on and a stirrup-shaped annular member 36 housed in the shoe 35 and secured to the connecting portion 34 at its upper end. As shown in FIG. 3, the annular member 36 is housed in the shoe 35 so that the flat bottom plate of the annular member 36 abuts against the internal bottom surface of the shoe 35 and the curved portion of the annular member 36 extending to both ends of the bottom plate abuts against the side wall of the cross section of the shoe 35. Further, a flexible insole member 37 (not shown in FIG. 1) is inserted in the shoe 35 in such a way that it covers the internal bottom surface of the shoe 35 and the bottom plate of the annular member 36. The connecting portion 34 is inserted in the shoe 35 through an opening of a shoestring attachment portion of the shoe 35.

To put the foot attachment portion 15 of each leg link 3 on each foot of the user A, the foot of the user A is inserted in the shoe 35 from the top opening of the shoe 35 by passing the toe portion of the foot through the annular member 36 and by placing the insole member 37 on the bottom surface of the foot and tightening the shoestring up, by which the foot attachment portion 15 is attached to the foot.

On the bottom surface of the insole member 37 of the foot attachment portion 15, force sensors 38 and 39 are attached to a location on the front side of the shoe 35 (a location closer to the front than the bottom plate of the annular member 36) and at a location on the rear side of the shoe 35 (a location closer to the rear than the bottom plate of the annular member 36). The force sensor 38 on the front side is disposed so as to be substantially right below a metatarsophalangeal joint (MP joint) of the foot of the user A wearing the foot attachment portion 15. The force sensor 39 on the rear side is disposed so as to be substantially right below the heel of the foot. In this embodiment, these force sensors 38 and 39 are one-axis force sensors which detect translational forces in a direction perpendicular to the bottom surface (ground contact surface) of the foot attachment portion 15 (a direction substantially perpendicular to a floor surface in a state wherein a leg or legs of the user A are standing). Hereinafter, the force sensors 38 and 39 will be referred to as an MP sensor 38 and a heel sensor 39, respectively. The MP sensor 38 and the heel sensor 39 constitute the first force sensor in the present invention. The insole member 37 does not necessarily have to be a rigid plate; it may alternatively be formed of a flexible material. If the insole member 37 is formed of a flexible material, providing the bottom surface thereof with a plurality of first force sensors permits highly accurate detection of a force applied to each portion of the bottom surface of a foot of the user A. On the other hand, if the insole member 37 is formed of a rigid plate, a treading force of an entire foot of the user A can be easily detected. This makes it possible to reduce the number of first force sensors attached to the bottom surface of the insole member 37.

The above describes the construction of the walking assistance device 1 according to this embodiment. Supplementarily, in a state wherein the foot attachment portion 15 is attached to each foot of the user A and the user A sits on the seat member 2 with the walking assistance device 1 in operation (while the second joint 12 is being driven by the electric motor 27) as described later, if the user A and the walking assistance device 1 are viewed from a frontal plane (when viewed from the front side of the user A), the thigh frame 11L of the left leg link 3L, for example, extends along the inner surface of the left leg of the user A (see FIG. 2), and the second joint 12L at the lower end of the second link 11L is positioned on the inner side of the left leg. Although not shown, the upper portion of the crus frame 13L (the upper portion of the upper crus frame 13L) connected to the second joint 12L extends along the inner surface of the left leg of the user A from the second joint 12L when viewed from the frontal plane. The crus frame 13L is formed so that the lower portion of the crus frame 13L gradually curves and reaches a point right above the instep of the foot of the left leg in front of the shin of the left leg. The same applies to the right leg link 3R.

When the user A having a typical build stands up in an upright posture, the second joints 12 of the leg links 3 jut out forward beyond the legs of the user A, as shown in FIG. 1. More specifically, the lengths of the thigh frame 11 and the crus frame 13 are set so that the sum of the lengths is slightly greater than the dimension of the inseam of a leg of the user A having the typical build. The lengths of the thigh frame 11 and the crus frame 13 set as described above and the stopper of the second joint 12 described above restrain the occurrence of a singular point state in which the thigh frame 11 and the crus frame 13 are aligned or a state in which the thigh frame 11 and the crus frame 13 bend in the opposite direction from that shown in FIG. 1. This restrains the control of the walking assistance device 1 from failing due to the singular point state or the reverse bend state of the leg links 3.

The second joint of each leg link 3 can be a translatory joint.

Although the details will be discussed later, in the walking assistance device 1 constructed as described above, an upward lifting force is applied from the seat member 2 to the user A by generating torques of the second joints 12 by the electric motors 27, with the foot attachment portions 15 being attached to the feet of the legs of the user A. At this time, for example, in a state where the user A is standing with both legs as stance legs (the legs to support the weight of the user A) (in the so-called two-leg supporting period), the foot attachment portions 15, 15 come in contact with a floor and floor reaction forces act on the respective ground contact surfaces. The floor reaction forces acting on the ground contact surfaces of the foot attachment portions 15 are such that the resultant force thereof is a force that balances out the sum of the gravity acting on the user A and the gravity acting on the walking assistance device 1, that is, the force for supporting the total weight of the user A and the walking assistance device 1 on a floor (the translational force, which will be hereinafter referred to as "the total supporting force"). When the legs of the user A are in locomotion together with the leg links 3 of the walking assistance device 1, more accurately a force for supporting an inertial force generated by the motions of the free leg of the user A and that of the walking assistance device 1 will be added to the total supporting force. However, in the walking assistance device 1 according to this embodiment, the electric motors 27 (actuators) and the encoders 28 having large weights are disposed near the waist rather than in the vicinity of the knees of the leg links 3. Only the foot attachment portions 15 of the leg links 3 are restricted by (attached to) the user A, so that the number of members to be attached to the user A is smaller, which makes the leg links 3 lighter. Therefore, an inertial force from a motion of the free leg of the walking assistance device 1 remains sufficiently small.

In this case, in the walking assistance device 1 according to this embodiment, only the two foot attachment portions 15, 15 are restrained by being attached to the user A. Each foot attachment portion 15 includes the annular link member 36. Therefore, the gravity acting on the walking assistance device 1 and the load received by the walking assistance device 1 from the user A (a downward translational force) through the seat member 2 hardly act on the user A; instead, they act on a floor surface from the two leg links 3, 3 through the annular link members 36, 36 of the two foot attachment portions 15, 15, respectively.

Accordingly, both leg links 3, 3 of the walking assistance device 1 are subjected to a supporting force for supporting the gravity acting on the walking assistance device 1 and a load received by the walking assistance device 1 from the user A through the seat member 2 out of the total supporting force. The supporting force is borne by the walking assistance device 1 through the two leg links 3, 3. Hereinafter, the supporting force borne by the walking assistance device 1 as described above is referred to as "the borne-by-the-assistance-device supporting force." In other words, the borne-by-the-assistance-device supporting force is for supporting the weight of the entire walking assistance device 1 and a weight corresponding to a load received by the seat member 2 from the user A (a part of the weight of the user A) on the floor. If both legs of the user A are standing (if both foot attachment portions 15 of the walking assistance device 1 are in contact with the ground), the borne-by-the-assistance-device supporting force is dividedly borne by the two leg links 3, 3 (a part of the borne-by-the-assistance-device supporting force is borne by one leg link 3 and the remainder thereof is borne by the other leg link 3). If only one leg of the user A is standing (if the other leg is free), all the borne-by-the-assistance-device supporting force is borne by the standing leg link 3. Hereinafter, the supporting force borne by one of the leg links 3 (the supporting force acting on one of the leg links 3) out of the borne-by-the-assistance-device supporting force is referred to as "the leg link supporting force": a supporting force borne by the right leg link 3 is referred to as "the right leg link supporting force"; and a supporting force borne by the left leg link 3 is referred to as "the left leg link supporting force." The total sum of the left leg link supporting force and the right leg link supporting force coincides with the borne-by-the-assistance-device supporting force.

Meanwhile, a supporting force, which is obtained by subtracting the borne-by-the-assistance-device supporting force from the total supporting force, acts from the floor surface to both legs of the user A, and this supporting force is borne by the user A with his/her legs. Hereinafter, the supporting force borne by the user A is referred to as "the borne-by-the-user supporting force." In other words, the borne-by-the-user supporting force is a supporting force for supporting the weight, which is obtained by subtracting a weight corresponding to a load to be applied by the user A to the seat member 2 of the walking assistance device 1 from the weight of the user A, on a floor. If both legs of the user A are standing, the borne-by-the-user supporting force is divided among and borne by both legs of the user A (a part of the borne-by-the-user supporting force is borne by one leg and the remainder thereof is borne by the other leg). If only one leg of the user A is standing, all the borne-by-the-user supporting force is borne by the one leg. Hereinafter, the supporting force borne by each leg (the supporting force acting on each leg from a floor surface) out of the borne-by-user supporting force is referred to as "the user's leg supporting force": a supporting force borne by the right leg is referred to as "the user's right leg supporting force"; and a supporting force borne by the left leg is referred to as "the user's left leg supporting force." The total sum of the user's left leg supporting force and the user's right leg supporting force coincides with the borne-by-user supporting force. The force that the user A applies to push the foot of each leg against a floor surface to support himself/herself is referred to as a treading force of the leg. The treading force of each leg balances out the user's leg supporting force.

Supplementarily, the force sensor 30 provided in each leg link 3 is located on the third joint 14, and therefore the supporting force that is obtained by subtracting the supporting force for supporting the weight of the portion below the force sensor 30 (the foot attachment portion 15 or the like) of the leg link 3 from the leg link supporting force related to the leg link 3 acts on the force sensor 30. Then, the components in three-axis directions (or the components in two-axis directions) of the acting supporting force are detected by the force sensor 30. In other words, the force acting on each force sensor 30 (which corresponds to the force to be controlled in the present invention) corresponds to the share for the leg link 3 provided with the force sensor 30 out of the total supporting force for supporting the weight, which is obtained by subtracting the total sum of the weights of the portions below the force sensors 30 from the weight of the entire walking assistance device 1, and the weight corresponding to a load imparted to the seat member 2 from the user A. Further, the total sum of the supporting forces detected by the two force sensors 30, 30, respectively, coincides with the total supporting force for supporting the weight, which is obtained by subtracting the total sum of the weights of the portions below the force sensors 30 from the weight of the entire walking assistance device 1, and the weight corresponding to a load imparted to the seat member 2 from the user A (hereinafter, the force sensors 30 are referred to as "the supporting force sensors 30"). The total sum of the weights of the portions below the supporting force sensors 30 of the walking assistance device 1 is sufficiently small, as compared with the weight of the entire walking assistance device 1. Hence, the supporting force acting on each of the supporting force sensors 30 is substantially equal to the leg link supporting force. Further, each supporting force sensor 30 is provided adjacently to the third joint 14 of the leg link 3 provided with the same. Hence, a supporting force acting on the supporting force sensor 30 is substantially equal to a translational force acting on the crus frame 13 from the third joint 14 of the leg link 3 (equal to the supporting force out of the leg link supporting force that is transmitted from the floor to the crus frame 13 through the third joint 14). Hereinafter, the total sum of the supporting forces acting on the supporting force sensors 30 or the translational forces acting on the crus frames 13 from the third joints 14 of the leg links 3 regarding both leg links 3, 3 is referred to as "the total lifting force." Of the total lifting force, the share for each leg link 3 is referred to as "the total lifting force share."

The total sum of the forces acting on the MP sensor 38L and the heel sensor 39L of the left foot attachment portion 15L corresponds to the above-mentioned user's left leg supporting force (or the treading force of the left leg), and the total sum of the forces acting on the MP sensor 38R and the heel sensor 39R of the right foot attachment portion 15R corresponds to the above-mentioned user's right leg supporting force (or the treading force of the right leg). In this embodiment, the MP sensor 38 and the heel sensor 39 are one-axis force sensors; however, they may alternatively be, for example, two-axis force sensors that detect also translational forces in directions substantially parallel to the bottom surface of the shoe 33, or they may be three-axis force sensors. The MP sensor 38 and the heel sensor 39 desirably are sensors capable of detecting translational forces in directions substantially perpendicular at least to the bottom surface of the shoe 33 or the floor surface.

The controller of the walking assistance device 1 constructed as described above will now be described.

FIG. 4 is a block diagram schematically showing the configuration (hardware configuration) of the controller 50. As shown in the figure, the controller 50 includes an arithmetic processing unit 51 composed of a microcomputer (a CPU, a RAM, and a ROM) and an input/output circuit (an A/D converter or the like), driver circuits 52R and 52L for the electric motors 27R and 27L, respectively, a lifting force setting key switch 53 for setting a desired value of the magnitude of a lifting force for the user A by the walking assistance device 1 (an upward translational force to be applied to the user A from the seat member 2), a lifting control ON/OFF switch 54 for selecting whether or not to generate a lifting force for the user A, a power battery 55, and a power circuit 57 that is connected to the power battery 55 through a power switch 56 (ON/OFF switch) and supplies power from the power battery 55 to the circuits 51, 52R and 52L of the controller 50 when the power switch 56 is turned on (closed). The lifting force setting key switch 53 corresponds to the desired lifting force setting means in the present invention.

The controller 50 is secured to the rear end of the seat member 2 or the plate 23R or 23L or the like through a bracket (not shown). The lifting force setting key switch 53, the lifting control ON/OFF switch 54, and the power switch 56 are mounted on the outer surface of the housing (not shown) of the controller 50 so that they are accessible for control. The lifting force setting key switch 53 is formed of a ten-key switch or a plurality of selector switches to permit direct setting of an intended desired value of a lifting force or selective setting from among a plurality of types of desired values prepared beforehand.

Connected to the controller 50 are the MP sensors 38R, 38L, the heel sensors 39R, 39L, the supporting force sensors 30R, 30L, and the rotary encoders 28R, 28L via connecting lines which are not shown. The output signals of these sensors are supplied to the arithmetic processing unit 51. The arithmetic processing unit 51 receives control signals of the lifting force setting key switch 53 and the lifting control ON/OFF switch 54 (including signals indicating the operation statuses of the switches). Further, the controller 50 is connected to the electric motors 27R, 27L via connecting lines, which are not shown, to supply current to the electric motors 27R and 27L from the driver circuits 52R, 52L. The arithmetic processing unit 51 determines command values of current (hereinafter referred to as "the indicator current values") for energizing the electric motors 27R, 27L by arithmetic processing (control processing) described later. The arithmetic processing unit 51 controls the driver circuits 52R, 52L on the basis of the indicator current values so as to control the generated torques of the electric motors 27R, 27L.

Output signals (voltage signals) of the MP sensors 38R, 38L, the heel sensors 39R, 39L, and the supporting force sensors 30R, 30L can be amplified by a preamplifier in the vicinity of these sensors and then input to the controller 50. The voltage values of the amplified output signals of the MP sensors 38R, 38L, the heel sensors 39R, 39L, and the supporting force sensors 30R, 30L are subjected to A/D conversion before the amplified output signals are supplied to the arithmetic processing unit 51.

The arithmetic processing unit 51 has functional means as shown in the block diagram of FIG. 5 as its main functional means. The functional means is a function implemented by a program stored in the ROM.

Referring to FIG. 5, the arithmetic processing unit 51 has right treading force measuring means 60R to which output signals of the MP sensor 38R and the heel sensor 39R of the right leg link 3R are supplied and left treading force measuring means 60L to which output signals of the MP sensor 38L and the heel sensor 39L of the left leg link 3L are supplied. The right treading force measuring means 60R is means for carrying out the processing for measuring the magnitude of a treading force of the right leg of the user A (the magnitude of the user's right leg supporting force) from the voltage values of output signals of the MP sensor 38R and the heel sensor 39R. Similarly, the left treading force measuring means 60L is means for carrying out the processing for measuring the magnitude of a treading force of the left leg of the user A (the magnitude of the user's left leg supporting force) from the voltage values of output signals of the MP sensor 38L and the heel sensor 39L). The treading force measuring means 60R and 60L correspond to the treading force measuring means in the present invention.

The arithmetic processing unit 51 includes right knee angle measuring means 61R and left knee angle measuring means 61L to which output signals (pulse signals) of the rotary encoders 28R and 28L are supplied. These knee angle measuring means 61R and 61L are means for measuring the bending angles in the second joints 12 (the displacements of the second joints 12) of the leg links 3 associated therewith. The second joint 12 of each leg link 3 corresponds to the knee joint of the leg link 3, and therefore the bending angle in the second joint is hereinafter referred to as the knee angle. These knee angle measuring means 61R and 61L correspond to the joint displacement measuring means in the present invention.

The arithmetic processing unit 51 also includes a right supporting force measuring means 62R to which output signals of the supporting force sensor 30R of the right leg link 3R and knee angles of the right leg link 3R measured by the right knee angle measuring means 61R are supplied, and a left supporting force measuring means 62L to which output signals (output voltages) of the supporting force sensor 30L of the left leg link 3L and knee angles of the left leg link 3L measured by the left knee angle measuring means 61L are supplied. The right supporting force measuring means 62R is means which carries out the processing for measuring the supporting force acting on the supporting force sensor 30R out of the right leg link supporting force, i.e., the total lifting force share for the right leg link 3R, on the basis of a received output signal of the supporting force sensor 30R and a measurement value of a knee angle of the right leg link 3R. Similarly, the left supporting force measuring means 62L is means which carries out the processing for measuring the supporting force acting on the supporting force sensor 30L out of the left leg link supporting force, i.e., the total lifting force share for the left leg link 3L, on the basis of a received output signal of the supporting force sensor 30L and a measurement value of a knee angle of the left leg link 3L. These supporting force measuring means 62R and 62L correspond to the force-to-be-controlled measuring means in the present invention.

The arithmetic processing unit 51 includes a left/right desired lifting force share determining means 63, which receives the measurement values of the measuring means 60R, 60L, 61R, 61L, 62R, and 62L and the control signals of the lifting force setting key switch 53 and the lifting control ON/OFF switch 54. The left/right desired lifting force share determining means 63 is means which carries out processing for determining a desired total lifting force, which is a desired value of the total lifting force, and also for determining the desired value of a share for each leg link 3 relative to the desired total lifting force, i.e., the desired value of the total lifting force share for each leg link 3 (hereinafter referred to simply as "a control desired value"). The control desired value corresponds to a desired share in the present invention (the fourth invention).

The arithmetic processing unit 51 includes a right feedback control input determining means 64R which receives a total lifting force share for the right leg link 3R measured by the right supporting force measuring means 62R and a control desired value of the right leg link 3R determined by the left/right desired lifting force share determining means 63, a left feedback control input determining means 64L which receives a total lifting force share for the left leg link 3L measured by the left supporting force measuring means 62L and a control desired value of the left leg link 3L determined by the left/right desired lifting force share determining means 63, a right feedforward control input determining means 65R which receives the total lifting force share for the right leg link 3R measured by the right supporting force measuring means 62R, the control desired value of the right leg link 3R determined by the left/right desired lifting force share determining means 63, and the knee angle of the right leg link 3R measured by the right knee angle measuring means 61R, and a left feedforward control input determining means 65L which receives the total lifting force share for the left leg link 3L measured by the left supporting force measuring means 62L, the control desired value of the left leg link 3L determined by the left/right desired lifting force share determining means 63, and the knee angle of the left leg link 3L measured by the left knee angle measuring means 61L. Each of the feedback control input determining means 64 is means which calculates a feedback control input (the feedback component of the indicator current value relative to each electric motor 27), according to a predetermined feedback control law, on the basis of a difference between a measurement value of an input total lifting force share and a control desired value so that the difference converges to zero. The feedforward control input determining means 65 is means which calculates a feedforward control input (the feedforward component of the indicator current value relative to each electric motor 27) for adjusting the measurement value of the total lifting force share to a control desired value, according to a predetermined feedforward control law, on the basis of an input measurement value of a total lifting force share, a control desired value, and a measurement value of a knee angle.

The arithmetic processing unit 51 includes addition means 66R which determines an indicator current value for the electric motor 27R of the right leg link 3R by adding a feedback control input calculated by the right feedback control input determining means 64R and a feedforward control input calculated by the right feedforward control input determining means 65R, and addition means 66L which determines an indicator current value for the electric motor 27L of the left leg link 3L by adding a feedback control input calculated by the left feedback control input determining means 64L and a feedforward control input calculated by the left feedforward control input determining means 65L.

The feedback control input determining means 64R, 64L, the feedforward control input determining means 65R, 65L, and the addition means 66R, 66L correspond to the actuator control means in the present invention.

The above is the overview of the arithmetic processing function of the arithmetic processing unit 51.

The control processing of the controller 50 according to this embodiment will now be described below, including detailed description of the processing of the arithmetic processing unit 51. In the walking assistance device 1 according to this embodiment, if the power switch 56 is OFF, no driving force is imparted to the second joints 12 of the leg links 3. This allows the joints 10, 12, and 14 to freely move. In this state, the leg links 3 are folded by their own weights. In this state, each foot attachment portion 15 is attached to each foot of the user A, and then the user A or an attendant lifts the seat member 2 and positions it under his/her crotch.

Subsequently, when the power switch 56 is turned on, power is supplied to the circuits of the controller 50, thus activating the controller 50. As the controller 50 is activated, the arithmetic processing unit 51 performs the processing, which is described below, at predetermined control processing cycles.

In each control processing cycle, the arithmetic processing unit 51 first performs the processing of the treading force measuring means 60R and 60L. This processing will be described below with reference to FIG. 6. FIG. 6 is a block diagram showing the flows of the processing by the treading force measuring means 60R and 60L. The treading force measuring means 60R and 60L share the same algorithm of processing. Therefore, any components related to the left treading force measuring means 60L are shown in parentheses in FIG. 6.

As representative processing, the processing of the right treading force measuring means 60R will be described below. First, a detected value of the MP sensor 38R (the detected value of a force indicated by an output voltage value of the MP sensor 38R) and a detected value of the heel sensor 39R (the detected value of a force indicated by an output voltage of the heel sensor 39R) of the leg link 3R are passed through low-pass filters in S101 and S102, respectively. The low-pass filters remove high-frequency components, such as noises, from the detected values of the sensors 38R and 39R, and the cutoff frequencies of the low-pass filters are set to, for example, 100 Hz.

Subsequently, the outputs of the low-pass filters are added in S103. This provides a provisional measurement value FRF_p_R of the treading force of the right leg of the user A. The provisional measurement value FRF_p_R contains an error component resulting mainly from the tightening of the shoestring of the right foot attachment portion 15R.

Hence, in this embodiment, the provisional measurement value FRF_p_R is subjected to conversion processing in S104, which provides a final measurement value FRF_R of the treading force of the right leg of the user A. The conversion processing of S104 is performed according to the table shown in FIG. 7. More specifically, if FRF_p_R is equal to or less than a predetermined first threshold value FRF1, the measurement value FRF_R is set to zero. This prevents a very small error component attributable mainly to the tightening of the shoestring of the foot attachment portion 15R from being obtained as the measurement value FRF_R. If the provisional measurement value FRF_p_R is larger than the first threshold value FRF1 and equal to or less than a second threshold value FRF2 (>FRF1), the measurement value FRF_R is linearly increased as the value of FRF_p_R increases. If FRF_p_R exceeds the second threshold value FRF2, the value of FRF_R is retained at a predetermined upper limit (the value of FRF_R obtained when FRF_p_R equals the second threshold value FRF2). The reason for setting the upper limit of FRF_R is described later.

The above has described the processing of the right treading force measuring means 60R. The same processing applies to the left treading force measuring means 60L.

The arithmetic processing unit 51 then sequentially performs the processing of the knee angle measuring means 61R, 61L and the processing of the supporting force measuring means 62R, 62L. These processing will be explained below with reference to FIG. 8 and FIG. 9. FIG. 8 is a block diagram showing the flows of the processing of the knee angle measuring means 61R, 61L and the processing of the supporting force measuring means 62R, 62L. The knee angle measuring means 61R and 61L share the same processing algorithm. The supporting force measuring means 62R and 62L also share the same processing algorithm. For this reason, any components related to the left knee angle measuring means 61L and the left supporting force measuring means 62L are shown in parentheses in FIG. 8.

As representative processing, the processing of the right knee angle measuring means 61R and the right supporting force measuring means 62R will be described below. First, the right knee angle measuring means 61R performs the processing of S201 and S202 to thereby obtain a measurement value $\theta 1\_R$ of a knee angle of the right leg link 3R (the bending angle of the leg link 3R in the second joint 12R). In S201, a provisional measurement value $\theta 1p\_R$ of a knee angle of the leg link 3R is calculated from an output of the rotary encoder 28R.

Referring now to FIG. 9, in this embodiment, an angle $\theta 1\_R$ formed by a segment S1 that connects the central point P related to the first joint 10R of the leg link 3R (the point P provides the center of rotation of forward/backward swing motions of the thigh frame 11R; the point P is hereinafter referred to as the forward/backward swing central point P) and the central point of the second joint 12R and a segment S2 that connects the central point of the second joint 12R and the central point of the third joint 14R is measured as the knee angle of the right leg link 3R. The same applies to the knee angle of the left leg link 3L. FIG. 9 schematically shows the construction of the essential section of the leg link 3.

In this case, in S201 described above, the reference rotational position of the second joint 12R is defined in a state wherein the thigh frame 11R and the crus frame 13R of the leg link 3R have a predetermined posture relationship (for example, the posture state shown in FIG. 1), that is, in the state wherein the knee angle $\theta 1\_R$ takes a predetermined value, and then a rotation amount from the reference rotational position (the amount of change in rotation angle, and it is proportional to the rotation amount of the rotor of the electric motor 27R) is measured from an output signal of the rotary encoder 28R. The value obtained by adding the measured rotation amount of the second joint 12R to the value of a knee angle of the leg link 3R at the above reference rotational position (which is stored and retained in a memory, which is not shown, beforehand) is determined as the provisional measurement value $\theta 1p\_R$.

The provisional measurement value $\theta 1p\_R$ sometimes contains a high-frequency noise component. Hence, the $\theta 1p\_R$ is passed through a low-pass filter in S202 to finally obtain a measurement value $\theta 1\_R$ of a knee angle of the leg link 3R.

The above has described the processing of the right knee angle measuring means 61R. The same processing applies to the left knee angle measuring means 61L.

Supplementarily, in this embodiment, the reason for measuring the angle $\theta 1$ formed by the segments S1 and S2 as the knee angle of the leg link 3 is because the measurement value of the angle $\theta 1$ is used mainly in the processing of the left/right desired lifting force share determining means 63, the details of which will be discussed later. In this case, in the walking assistance device 1 according to this embodiment, the angle formed by the central axis of the thigh frame 11 of each leg link 3 and the segment S1 is constant. Therefore, in each knee angle measuring means 61, the angle formed by, for example, the central axis of the thigh frame 11 of the leg link 3 and the segment S2 related to the crus frame 13 may be determined beforehand as the knee angle of the leg link 3, and then the angle $\theta 1$ may be determined from the knee angle by the processing of the left/right desired lifting force share determining means 63, which will be described later.

After the measurement value $\theta 1\_R$ of the knee angle of the leg link 3R is determined as described above, the processing of the right supporting force measuring means 62R is performed in S203 to calculate a measurement value Fankle_R of a supporting force acting on the supporting force sensor 30R (in other words, the total lifting force share for the leg link 3R) from the measurement value $\theta 1\_R$ of the knee angle obtained in S202 and the detected values of the supporting force sensor 30R (the detected values of the forces of two axes indicated by the voltage values of output signals of the supporting force sensor 30R). This processing will be described in detail below with reference to FIG. 9.

The supporting force (the total lifting force share) Fankle_R acting on the supporting force sensor 30R of the leg link 3R is substantially equal to the translational force acting on the crus frame 13R from the third joint 14R of the leg link 3R, as described above. Further, the translational force is substantially equal to a vector (a vector with a segment S3 as a line of action) toward the forward/backward swing central point P of the leg link 3R from the third joint 14R. Therefore, in the walking assistance device 1 according to this embodiment, the direction of Fankle_R is parallel to the segment S3 that connects the central point of the third joint 14 of the leg link 3R and the forward/backward swing central point P.

Note here that strictly the direction of Fankle_R may be slightly nonparallel to the segment S3 due to the effects of frictional forces or gravities in the first to third joints 10, 12, and 14, acceleration and deceleration in walking, the magnitude of the total lifting force of the walking assistance device 1, and the like. These effects are, however, very small and therefore they are ignored in this embodiment.

Meanwhile, the supporting force sensor 30R detects a force Fz in a z-axis direction perpendicular to the surface (the upper surface or the lower surface) of the supporting force sensor 30R and a force Fx in an x-axis direction, which is perpendicular to the z-axis and parallel to the surface of the supporting force sensor 30R, as shown in the figure. The x-axis and the z-axis are coordinate axes fixed to the supporting force sensor 30R, and are parallel to a plane that includes the arc of the guide rail 22. At this time, the detected Fz and Fx denote a component in the z-axis direction and a component in the x-axis direction, respectively, of Fankle_R. Accordingly, as illustrated, if the angle formed by Fankle_R and the z-axis is denoted as $\theta k$, Fankle_R can be calculated according to the following expression (1) from the detected values of Fz and Fx and $\theta k$.

$$Fankle\_R = Fx \cdot \sin\theta k + Fz \cdot \cos\theta k \quad (1)$$

The angle $\theta k$ is determined as follows. If the angle formed by the segment S2 and the segment S3 (=the angle formed by the direction of Fankle and the segment S2) is denoted as $\theta 2$, lengths L1 and L2 of the segments S1 and S2, respectively, in a triangle having the segments S1, S2, and S3 as its three sides are set to constant values (known values set in advance). The angle θ1 formed by the segments S1 and S2 is the measurement value θ1_R obtained as described above in relation to the right knee angle measuring means 61R. Therefore, the angle θ2 is determined by geometric calculation from the lengths L1 and L2 (these values are stored and retained in a memory beforehand) of the segments S1 and S2, respectively, and the measurement value θ1_R of the angle θ1.

Specifically, in the triangle having the segments S1, S2, and S3 as its three sides, the relational expressions of (2) and (3) given below hold. Note that L3 denotes the length of the segment S3.

$$L3^2 = L1^2 + L2^2 - 2 \cdot L1 \cdot L2 \cdot \cos\theta1 \quad (2)$$

$$L1^2 = L2^2 + L3^2 - 2 \cdot L2 \cdot L3 \cdot \cos\theta2 \quad (3)$$

Thus, L3 can be calculated according to expression (2) from the values of L1 and L2 and the measurement value of the angle θ1. Then, the angle θ2 can be calculated according to expression (3) from the calculated value of L3 and the values of L1 and L2.

Further, if the angle formed by the z-axis and the segment S2 is denoted by θ3, this angle θ3 takes a constant value set beforehand on the basis of the angle at which the supporting force sensor 30 is mounted on the crus frame 13. Then, the value of an angle θk required for the calculation of expression (1) can be determined by subtracting the angle θ2 calculated as described above from the angle θ3 of the constant value (this value is stored and retained in a memory, which is not shown, beforehand).

Thus, in the processing of S203 of the right supporting force measuring means 62R in this embodiment, the measurement value Fankle_R of the total lifting force share for the right leg link 3R can be obtained according to the above expression (1) from θk calculated as described above and the detected values Fx and Fz of the supporting force sensor 30 of the leg link 3R.

The above has described the detailed description of the processing of S203 of the right supporting force measuring means 62R. The same applies to the processing of the left supporting force measuring means 62L.

Although the supporting force sensor 30 is a three-axis force sensor or a two-axis force sensor so as to obtain the measurement value Fankle of the total lifting force share for each leg link according to the above expression (1) in this embodiment, even if the supporting force sensor 30 is an one-axis force sensor, it is possible to obtain the measurement value Fankle. For example, if the supporting force sensor 30 is a sensor that detects only the force Fx in the x-axis direction shown in FIG. 9, the measurement value Fankle can be determined according to expression (4) given below. If the supporting force sensor 30 is a sensor that detects only the force Fz in the z-axis direction shown in FIG. 9, the measurement value Fankle can be determined according to expression (5) given below.

$$\text{Fankle} = Fx / \sin\theta k \quad (4)$$

$$\text{Fankle} = Fz / \cos\theta k \quad (5)$$

However, using the above expression (4) or (5) leads to deteriorated accuracy in the value of Fankle as the value of the angle θk approaches 0 degrees or 90 degrees. For this reason, it is desirable to use expression (1) to obtain the measurement values of Fankle.

Alternatively, the measurement value Fankle can be obtained by determining the square root of the sum of a square value of Fx and a square value of Fz. In this case, the measurement value θ1 of the knee angle is unnecessary.

Supplementarily, the processing of the measuring means 60, 61, and 62 described above does not necessarily have to be performed in sequential order, but they can alternatively be performed in parallel by a time-sharing manner or the like. If, however, θ1 is used in the processing of the supporting force measuring means 62R and 62L, then the processing of the knee angle measuring means 61R and 61L need be performed before the processing of the supporting force measuring means 62R and 62L.

In this embodiment, a supporting force sensor 30 (the second force sensor) for measuring the total lifting force share for the leg links 3 is located between the third joint 14 and the crus frame 13 (more accurately, the upper crus frame 13a). Alternatively, however, the supporting force sensor can be installed between the third joint 14 and the foot attachment portion 15 (for example, between the third joint 14 and the connecting portion 34 of the foot attachment portion 15). In this case, the supporting force acting on the crus frame 13 from the third joint 14 can be measured by measuring the rotation angle of the third joint 14 and coordinate-transforming the supporting force detected by the supporting force sensor positioned between the third joint 14 and the foot attachment portion 15.

Subsequently, the arithmetic processing unit 51 performs the processing of the left/right desired lifting force share determining means 63. This processing will be described in detail below with reference to FIG. 10. FIG. 10 is a block diagram showing the flow of the processing of the left/right desired lifting force share determining means 63.

First, in S301, the measurement value Fankle_R of the total lifting force share for the right leg link 3R and the measurement value Fankle_L of the total lifting force share for the left leg link 3L determined by the supporting force measuring means 62 as described above are added to obtain a total lifting force Fankle_t. This total lifting force Fankle_t corresponds to the measurement value of the total sum on both leg links 3 and 3 of the supporting forces acting on the supporting force sensors 30 or the translational forces acting on the crus frames 13 from the third joints 14 of the leg links 3 as described above. The total lifting force Fankle_t is substantially equal to the supporting force borne by the assistance device.

Subsequently, either the value obtained by subtracting an output value of S307 and an output value of S312, which will be described later, from the total lifting force Fankle_t or the total lifting force set value associated with the lifting force (desired lifting force) applied to the user A from the seat member 2 set by the lifting force setting key switch 53 is selectively output in S302 according to a control signal of the lifting control ON/OFF switch 54 (a signal indicating whether the switch 54 is on or off). In this case, according to this embodiment, the lifting control ON/OFF switch 54 is turned on when the user A wishes to receive a lifting force from the seat member 2; otherwise, the lifting control ON/OFF switch 54 is held OFF. In S302, if the lifting control ON/OFF switch 54 is OFF, the total lifting force Fankle_t is selected and output. If the lifting control ON/OFF switch 54 is ON, the total lifting force set value is selected and output.

Supplementarily, the total lifting force set value is obtained by adding the magnitude of the supporting force for supporting the weight, which is determined by subtracting the total weight of the portions below the supporting force sensors 30 from the weight of the entire walking assistance device 1 (in other words, the supporting force that balances out the gravity generated by the weight obtained by the subtraction), to the set value of a lifting force input through the key switch 53. The magnitude of the supporting force is stored and retained in a memory, which is not shown, beforehand. The total weight of the portions below the supporting force sensors 30 is sufficiently smaller than the weight of the entire walking assistance device 1. Therefore, the result obtained by adding the magnitude of a supporting force for supporting the weight of the entire walking assistance device 1 (the supporting force that balances out the gravity acting on the entire walking assistance device 1) to the lifting force set value (desired lifting force) can be determined as the total lifting force set value. Alternatively, an arrangement may be made so that a total lifting force set value can be directly entered by operating the key switch 53.

Subsequently, the output of S302 is passed through a low-pass filter in S303, and thereby the desired total lifting force is determined. The low-pass filter in S303 functions to prevent a sudden change in a desired total lifting force if an output in S302 suddenly changes (which occurs, for example, when a total lifting force set value is changed or when an output in S302 is switched between the value obtained by subtracting an output value in S307 and an output value in S312, which will be described later, from the total lifting force Fankle_t and a total lifting force set value) and consequently to prevent a sudden change in the lifting force acting on the user A from the seat member 2. The cutoff frequency of the low-pass filter is, for example, 0.5 Hz. The processing of S301 to S303 corresponds to the total desired lifting force determining means in the present invention.

Subsequently, in S304, a distribution ratio, which is a ratio for distributing a desired total lifting force to the left and right leg links 3, is determined on the basis of the magnitude of the measurement value FRF_R of a treading force of the right leg and the magnitude of the measurement value FRF_L of a treading force of the left leg that have been determined by the treading force measuring means 60, as described above. This distribution ratio is composed of a right distribution ratio, which is the ratio of allocation to the right leg link 3R, and a left distribution ratio, which is the ratio of allocation to the left leg link 3L, of a desired total lifting force, and the sum of both distribution ratios is 1.

In this case, the right distribution ratio is determined to be FRF_R/(FRF_R+FRF_L), which is the ratio of the magnitude of FRF_R relative to the sum of the magnitude of the measurement value FRF_R and the magnitude of the measurement value FRF_L. Similarly, the left distribution ratio is determined to be FRF_L/(FRF_R+FRF_L), which is the ratio of the magnitude of FRF_L relative to the sum of the magnitude of the measurement value FRF_R and the magnitude of the measurement value FRF_L. In this case, in a state wherein one of the legs of the user A is a standing leg, while the other leg is a free leg (in other words, in a one-leg supporting state), the distribution ratio for the free leg is zero, and the distribution ratio for the standing leg is 1. The processing of S304 can be performed in parallel with the processing of S301 to S303 described above.

The following describes the reason for setting an upper limit of the measurement value FRF of a treading force of each leg in the conversion processing in S104 of each treading force measuring means 60 (see FIG. 6). In a state where both legs of the user A are standing (in other words, the state in a two-leg supporting period), the provisional measurement value FRF_p of a treading force of each leg generally does not smoothly change, but tends to frequently fluctuate. In such a case, if the left and right distribution ratios were determined on the basis of the provisional measurement value FRF_p, then the distribution ratio would frequently change and the allocation ratio of each leg link 3 out of a desired total lifting force would be apt to change accordingly. As a result, a minute change would easily occur in a lifting force acting on the user A from the seat member 2, and consequently the minute change may cause the user A to feel uncomfortable. For this reason, in this embodiment, an upper limit of the measurement value FRF of a treading force of each leg has been set to prevent frequent changes in the left and right distribution ratios in the state of the two-leg supporting period. In this case, in the state of the two-leg supporting period, both the left and right distribution ratios are basically maintained at ½ except for a period immediately after the start of the two-leg supporting period and a period immediately before the end thereof, thus stabilizing the left and right distribution ratios.

In the above FIG. 7, the measurement value FRF_R(L) can be obtained according to the table which has only the threshold value FRF1 and in which the measurement value FRF_R (L) of a treading force linearly increases if the provisional measurement value FRF_p_R(L) of a treading force of each leg of the user A is equal to or more than the threshold value FRF1. The threshold values FRF1, FRF2, and the like of the table for obtaining FRF_R(L) from the provisional measurement value FRF_p can be appropriately determined according to the lifting force that feels comfortable to the user A, the weight of the walking assistance device 1, the calculation capability of the controller 50, and the like.

Returning to the explanation of FIG. 10, the processing of S305 and S310 is performed. The processing of S305 and S310 can be performed in parallel with the processing of S301 to S303 or the processing of S304.

The processing of S305 is performed to determine an operating force for generating a posture restoring force like that of a spring in the right leg link 3R. Hereinafter, the operating force is referred to as a spring restoring force.

Since the processing of S305 and the processing of S310 share the same algorithm, the following typically describes the processing of S305 related to the right leg link 3R with reference to FIG. 9.

In the processing of S305, first, the length L3 of the segment S3 in FIG. 9, namely the length L3 of the segment S3 connecting the central point of the third joint 14 of the leg link 3R to the central point P of the forward/backward swing central point P is calculated according to the expression (2) by using the measurement value θ1_R of the knee angle of the leg link 3R determined by the processing of the right knee angle measuring means 61R described above. Then, a value obtained by multiplying the value (L3−L3S), which has been obtained by subtracting a predetermined reference value L3S from the calculated L3, by a predetermined spring constant k is determined as a spring restoring force of the right leg link 3R.

More specifically, the spring restoring force is calculated according to the following expression (6).

$$\text{Spring restoring force} = k \cdot (L3 - LS3) \quad (6)$$

The same applies to the processing of S310 related to the left leg link 3L. The spring restoring force of each leg link 3 calculated as described above corresponds to the supporting force (a request value of the supporting force) to be additionally applied to the walking assistance device 1 in order to restore the posture of the leg link 3 back to the posture in which the length L3 of the segment S3 shown in FIG. 9 agrees with the reference value L3S.

In this embodiment, the spring restoring force is determined according to a proportional control law as a feedback control law; alternatively, however, other techniques, such as the PD control law, can be used. The length L3 of the segment S3 is equal to the length obtained by adding a substantially constant offset value to the interval between the third joint 14 of each leg link 3 and the seat member 2. Thus, calculating a spring restoring force so that the difference (L3−L3S) approximates zero is equivalent to calculating the spring restoring force so that the difference between the interval between the third joint 14 of each leg link 3 and the seat member 2 and the predetermined reference value (the value obtained by subtracting the offset value from L3S) approximates zero.

Subsequently, the processing of S306 to S309 related to the right leg link 3R and the processing of S311 to S314 related to the left leg link 3L are performed. In the processing of S306 to S309 related to the right leg link 3R, first, in S306, the desired total lifting force obtained in S303 is multiplied by a right distribution ratio. This determines a reference desired value of the total lifting force share to be borne by the right leg link 3R out of the desired total lifting force. This reference desired value means the total sum of the share for the right leg link 3R out of a desired lifting force, which is the desired value of a lifting force to be applied to the user A from the seat member 2, and the share for the right leg link 3R out of a supporting force for supporting the weight obtained by subtracting the total weight of the portions below the supporting force sensors 30 from the weight of the entire walking assistance device 1 (or the weight of the entire walking assistance device 1).

Further, in S307, the spring restoring force determined in S305 is multiplied by the right distribution ratio. Then, the value obtained as a result of the multiplication (which corresponds to the correction amount of a desired share in the present invention) is added to the reference desired value of the total lifting force share for the right leg link 3R in S308, by which a provisional desired value Tp_Fankle_R of the total lifting force share for the right leg link 3R is determined. Thereafter, the provisional desired value Tp_Fankle_R is passed through a low-pass filter in S309, thereby finally determining a control desired value T_Fankle_R, which is the desired value of the total lifting force share for the right leg link 3R. The low-pass filter of S309 functions to remove noise components attributable to changes in the knee angle θ1. The cutoff frequency is set to, for example, 15 Hz.

Similarly, in the processing of S311 to S314 related to the left leg link 3L, first, in S311, the desired total lifting force obtained in S303 is multiplied by a left distribution ratio. This determines a reference desired value of the total lifting force share to be borne by the left leg link 3L out of the desired total lifting force. This reference desired value means the total sum of the share for the left leg link 3L out of a desired lifting force, which is the desired value of a lifting force to be applied to the user A from the seat member 2, and the share for the left leg link 3L out of a supporting force for supporting the weight obtained by subtracting the total weight of the portions below the supporting force sensors 30 from the weight of the entire walking assistance device 1 (or the weight of the entire walking assistance device 1).

Further, in S312, the spring restoring force determined in S310 is multiplied by the left distribution ratio. Then, the value obtained as a result of the multiplication (which corresponds to the correction amount of a desired share in the present invention) is added to the reference desired value of the total lifting force share for the left leg link 3L in S313, by which a provisional desired value Tp_Fankle_L of the total lifting force share for the left leg link 3L is determined. Then, the provisional desired value Tp_Fankle_L is passed through a low-pass filter in S314, thereby finally determining a control desired value T_Fankle_L, which is the desired value of the total lifting force share for the left leg link 3L. For example, if a desired total lifting force, which is an output of S303, is 200 N (Newton) and the left and right distribution ratio (an output in S304) according to the left and right treading forces of the user A is 0.4:0.6, then the output in S306 is 120 N and the output in S311 is 80 N.

The above is the processing of the left/right desired lifting force share determining means 63. As described above, basically, the control desired values T_Fankle_L and T_Fankle_R of the left and right leg links 3 are determined in such a way that the ratios thereof will be the same as the ratios of the left and right treading forces of the user A. Further, spring restoring forces related to the left leg link 3L and the right leg link 3R are added to the control desired values T_Fankle_L and T_Fankle_R, respectively. The total sum of the spring restoring force added to the control desired value T_Fankle_L and the spring restoring force added to the control desired value T_Fankle_R will be a weighted average value, which uses the left and right distribution ratios of the spring restoring forces calculated in S305 and S310, respectively, as weighting factors. Accordingly, the total sum of the control desired values T_Fankle_L and T_Fankle_R will be a value obtained by adding the weighted average value of the spring restoring force to the desired total lifting force determined in S303.

The processing of S304, S306, and S311 corresponds to the distribution means in the present invention.

After the processing of the left/right desired lifting force share determining means 63 is performed as described above, the arithmetic processing unit 51 performs the processing of the feedback control input determining means 64R and 64L and the feedforward control input determining means 65R and 65L in sequence or in parallel.

The processing of the feedback control input determining means 64R and 64L will be described below with reference to FIG. 11. FIG. 11 is a block diagram showing the flows of the processing of the feedback control input determining means 64R and 64L. The feedback control input determining means 64R and 64L share the same algorithm, and therefore any components related to the left feedback control input determining means 64L are shown in parentheses in FIG. 11.

The processing of the right feedback control input determining means 64R is typically described below. First, a difference (T_Fankle_R−Fankle_R) between a control desired value T_Fankle_R of the right leg link 3R determined by the left/right desired lifting force share determining means 63 and a measurement value Fankle_R of the total lifting force share for the right leg link 3R measured by the right supporting force measuring means 62 is calculated in S401. Then, the difference is multiplied by gains Kp and Kd in S402 and S403, respectively. The calculation result of S403 is differentiated in S404 ("s" in the figure denoting a differential operator), and the differential value and the calculation result of S402 are added in S405. Thereby, a control input Ifb_R of the current of the right electric motor 27 is calculated according to the PD control law, which serves as the feedback control law, so that the difference (T_Fankle_R−Fankle_R) converges to zero. The control input Ifb_R means a feedback component of an indicator current value of the right electric motor 27.

In this case, according to this embodiment, the values of the gains Kp and Kd are variably set according to the measurement value θ1_R of a knee angle of the leg link 3R. This is because the sensitivity of the electric motor 27R to changes in the lifting force of the seat member 2 in response to changes in current (changes in torque) of the electric motor 27R varies according to the knee angle of the leg link 3R. In this case, as the knee angle θ1_R increases (as the leg link 3R stretches), the sensitivity of the electric motor 27R to the changes in the lifting force of the seat member 2 in response to changes in current (changes in torque) increases. Therefore, in S406, the values of gains Kp and Kd are basically set so that the values of the gains Kp and Kd are reduced as the measurement value θ1_R of the knee angle of the leg link 3R increases according to a data table, which is not shown.

The above is the processing of the right feedback control input determining means 64R. The same applies to the processing of the left feedback control input determining means 64L. In this embodiment, the PD control law is used as the feedback control law so as to permit quick and stable control of lifting forces. Alternatively, however, a feedback control law other than the PD control law can be used.

Referring now to FIG. 12, the processing of the feedforward control input determining means 65R and 65L will be described. FIG. 12 is a block diagram showing the flows of the processing of the feedforward control input determining means 65R and 65L. The algorithms of the feedforward control input determining means 65R and 65L share the same algorithm, and therefore any components related to the left feedforward control input determining means 65L are shown in parentheses in FIG. 12.

The processing of the right feedforward control input determining means 65R will be typically described. In S501, the measurement value θ1_R of the knee angle of the leg link 3R measured by the knee angle measuring means 61 R is differentiated to calculate an angular velocity ω1_R of a bending angle of the second joint 12 of the leg link 3R. Further, in S502, the measurement value θ1_R of the knee angle of the leg link 3R and the measurement value Fankle_R of the total lifting force share for the leg link 3R measured by the supporting force measuring means 62R are used to calculate an actual tension T1, which is an actual tension of the wires 32a and 32b of the leg link 3R. The processing for calculating the actual tension T1 will be described with reference to FIG. 13. In FIG. 13, the leg links 3 are typically shown. Further, in FIG. 13, like elements as those in FIG. 9 are assigned like reference numerals.

First, a component Fankle_a that is orthogonal to the segment S2 of the measurement value Fankle_R of a total lifting force share for the leg link 3R is calculated according to the following expression (7).

$$\text{Fankle}\_a = \text{Fankle}\_R \cdot \sin\theta 2 \quad (7)$$

The angle θ2 is an angle formed by Fankle_R and the segment S2, and the θ2 is calculated by geometric calculation using the measurement value θ1_R, as described above with reference to FIG. 9 (see the expressions (2) and (3)).

Then, the Fankle_a determined as described above is multiplied by the length L2 of the segment S2, as shown in the following expression (8), by which a moment M1 generated in the second joint 12 (knee joint) is calculated based on Fankle_R.

$$M1 = \text{Fankle}\_a * L2 \quad (8)$$

The moment generated in the pulley 31 by the actual tension T1 of the wires 32a and 32b balances out the moment M1 in a steady state. Further, the moment M1 is divided by an effective radius r of the pulley 31 according to the following expression (9) so as to calculate the actual tension T1 of the wires 32a and 32b.

$$T1 = M1/r \quad (9)$$

The above is the details of the processing in S502.

Returning to the description of FIG. 12, further, a desired tension T2 of the wires 32a and 32b of the leg link 3R is calculated in S503. The desired tension T2 is a tension to be generated in the wires 32a and 32b on the basis of a control desired value (the desired value of a total lifting force share) of the leg link 3R determined in the processing of the left/right desired lifting force share determining means 63. The desired tension T2 is calculated in the same manner as in the calculation processing in S502. More specifically, a component orthogonal to the segment S2 of the control desired value T_Fankle_R (see FIG. 13) is calculated according to an expression in which Fankle_R in the right side of the above expression (7) has been replaced by the control desired value T_Fankle_R of the leg link 3R determined by the processing of the left/right desired lifting force share determining means 63. Then, the calculated component replaces Fankle_a in the right side of the above expression (8), by which a desired moment of the second joint 12 of the leg link 3R is calculated. Further, the desired moment replaces M1 in the right side of the above expression (9), by which the desired tension T2 of the wires 32a and 32b is calculated.

The above is the processing of S503.

After the processing of S501 to S503 is performed, a control input of current of the electric motor 27R Iff_R is determined in S504 by predetermined feedforward processing by using the angular velocity ω1_R of the second joint 12, the actual tension T1 of the wires 32a and 32b, and the desired tension T2 calculated as described above. The control input Iff_R means a feedforward component of an indicator current value of the electric motor 27R.

In the processing of S504, the control input Iff_R is calculated according to a model expression represented by the following expression (10).

$$Iff\_R = B1 \cdot T2 + B2 \cdot \omega 1\_R + B3 \cdot sgn(\omega 1\_R) \quad (10)$$

where B2=b0+b1·T1, B3=d0+d1·T1

In the expression (10), B1 is a constant factor, and B2 and B3 are factors each represented by a linear function of the actual tension T1 as described in the conditional clause of the expression (10). In addition, b0, b1, d0, and d1 are constants. Further, sgn( ) is a sign function.

This expression (10) is a model expression representing the relationship among the current of the electric motor 27, the tension of the wires 32a and 32b, and the angular velocity ω1 of the second joint 12. A first term of the right side of the expression (10) means the proportional term of tension, a second term means the term based on the viscous frictional force between the wires 32a, 32b and the pulley 31 or the rubber tube (the protecting tube for the wires 32a and 32b), and a third term means a term based on a dynamic frictional force between the wires 32a, 32b and the pulley 31 or the rubber tube (the protecting tube for the wires 32a and 32b). A term based on angular acceleration of the second joint 12 (in other words, a term based on an inertial force) can be further added to the right side of the expression (10)

Supplementarily, the constants B1, b0, b1, d0, and d1 used for the calculation of the expression (10) are experimentally identified by an identification algorithm that minimizes the square value of the difference between a value of the left side and a value of the right side of the expression (10) beforehand. Then, the identified constants B1, b0, b1, d0, and d1 are stored and retained in a memory, which is not shown, and used when the walking assistance device 1 is operated.

The above is the processing of the right feedforward control input determining means 65R. The same applies to the processing of the left feedforward control input determining means 65L.

Referring to FIG. 5, after calculating the control inputs Ifb_R and Iff_R of the current of the electric motor 27R and the control inputs Ifb_L and Iff_L of the current of the electric motor 27L as described above, the arithmetic processing unit 51 adds the control inputs Ifb_R and Iff_R by the addition means 66R. Thereby, the indicator current value of the electric motor 27R is determined. Further, the arithmetic processing unit 51 adds the control inputs Ifb_L and Iff_L by the addition means 66L. Thereby, the indicator current value of the electric motor 27L is determined. Then, the arithmetic processing unit 51 outputs these indicator current values to the driver circuits 52 associated with the individual electric motors 27. At this time, the driver circuit 52 energizes the electric motors 27 on the basis of the supplied indicator current values.

The control processing of the arithmetic processing unit 51 described above is performed at predetermined control cycles. Thus, the torque to be generated in the electric motors 27 and eventually the driving force of the second joint 12 (the knee joint) of the leg link 3 are controlled so that the measurement value Fankle of an actual total lifting force share for each leg link 3 agrees with (converges to) the control desired value T_Fankle corresponding to the leg link 3.

In the first embodiment described hereinabove, the line of action of the supporting force (translational force) transmitted from the third joint 14 of each leg link 3 to the crus frame 13 is substantially the same as a straight line which passes through the forward/backward swing central point P existing above the seat member 2 within the width in the anteroposterior direction of the contact surface between the seat member 2 and the user A from the central point of the third joint 14. Then, each leg link 3 is free to swing in the forward/backward direction with respect to the seat member 2 with the forward/backward swing central point P as a fulcrum. Therefore, the position and posture of the seat member 2 balance out in a state where an action point (more specifically, a center of gravity of a load distributed over the contact surface between the user A and the seat member 2) of a load applied to the seat member 2 from the user A (a translational force which is balanced with a lifting force from the seat member 2 to the user A) exists just under the forward/backward swing central point P, in other words, a state where the line of action of the load is a vertical straight line which passes through the forward/backward swing central point P. Moreover, if the action point of the load from the user A to the seat member 2 displaces due to inclination of the upper body of the user A or the like, the position and posture of the seat member 2 automatically try to restore the above state of balance. Therefore, when viewed in the sagittal plane, the line of action of the load from the user A to the seat member 2 and the line of action of the supporting force (translational force) transmitted from the third joint 14 of each leg link 3 to the crus frame 13 basically pass through the common point P. As a result, these lines of action are spaced apart from each other in the anteroposterior direction, which thereby prevents the load and supporting force from acting on the seat member 2 with opposite forces in equilibrium. Therefore, it is possible to prevent the seat member 2 from being displaced with respect to the user A or the like so as to allow the seat member 2 to be stable in position and posture. Consequently, an intended lifting force can be applied to the user A from the seat member 2 stably and appropriately.

In addition, a total desired lifting force is distributed to the left and right leg links 3R and 3L so as to correspond to the ratio of the treading force of the right leg and the treading force of the left leg of the user A, thereby determining the total lifting force share for each leg link 3, and this total lifting force share is generated in each leg link 3. Therefore, especially in a state where the lifting control ON/OFF switch 54 is ON, a lifting force set using the key switch 53 (a desired lifting force) can be applied smoothly and stably to the user A from the seat member 2. This makes it possible to effectively reduce a load on the legs of the user A.

Supplementarily, a total desired lifting force equals the value obtained by adding a set value of a lifting force set through the key switch 53 (a desired lifting force) and the magnitude of a supporting force for supporting a weight obtained by subtracting the total weight of the portions below the supporting force sensors 30 from the weight of the entire walking assistance device 1 (or the weight of the entire walking assistance device 1) (more accurately, a value obtained by passing the result of the addition through the low-pass filter) as described above. Therefore, determining the total lifting force share for each leg link 3 as described above eventually distributes a desired lifting force, which is the desired value of the lifting force to be applied to the user A from the seat member 2, to the left and right leg links 3L and 3R according to the ratio between the treading force of the right leg and the treading force of the left leg of the user A. Then, the electric motors 27L and 27R of the leg links 3L and 3R are controlled so that the distributed desired lifting force shares to be borne by the leg links 3L and 3R, respectively, act on the seat member 2 from the leg links 3L and 3R.

Further, the spring restoring force is generated in each leg link 3, and therefore the walking assistance device 1 provides a larger lifting force as the user A bends his/her knee or knees deeper. This arrangement enables the user A to easily acquire the feeling of being assisted by the walking assistance device 1. Furthermore, setting the spring constant k related to a spring restoring force (see the above expression (6)) to a proper value makes it possible to prevent the posture of the leg links 3 from diverging to inappropriate postures.

When the lifting control ON/OFF switch 54 is OFF, a value corresponding to the weight of portions located above the supporting force sensors 30 of the walking assistance device 1 is determined as a total desired lifting force. In this state, it is possible to maintain the seat member 2 and the user A in a balanced state where no acting force is generated between them while the seat member 2 is in contact with the user A, unless the user A intentionally applies his/her weight to the seat member 2. In this state, when the lifting control ON/OFF switch 54 is turned on, a lifting force can be smoothly applied to the user A while preventing a lifting force from being suddenly applied to the user A from the seat member 2 by the low-pass filter (see S303 in FIG. 10).

Moreover, the indicator current values of the electric motors 27 are determined according to the PD control law (the feedback control law) and the feedforward control law in combination, thus permitting quick and stable lifting force control.

In the above embodiment, a spring restoring force has been added to the desired value (the control desired value) of a total lifting force share for each leg link 3; alternatively, however, the addition of the spring restoring force can be omitted (more specifically, the processing of S305, S307, S310, and S312 shown in FIG. 10 can be omitted). In this case, the Fankle_t determined in S301 of FIG. 10 is directly input to S302.

Further, the guide rail 22 shown in FIG. 1 is not limited to an arc-shaped guide rail, but any other shape can be applied only if it allows the thigh frame 11 to swing in the forward/backward direction such as a part of the periphery of an oval shape (an elliptic arc). Unless the guide rail 22 is arc-shaped, the position of the forward/backward swing central point P varies within a predetermined region according to the operation of the walking assistance device 1. In this case, when Fankle is determined, the center of rotation of the thigh frame 11 in that instant is set as the forward/backward swing central point P in each predetermined arithmetic processing period. Then, the straight line connecting the central point P to the third joint 14 is used as a line of action of Fankle to calculate Fankle in the same manner as in the above embodiment.

Moreover, if the walking assistance device 1 is provided with an orthosis (a waist belt or the like) which prevents the seat member 2 from rotating meaninglessly, the forward/backward swing central point P can be set in a position not within the width in the anteroposterior direction of the seat member 2.

Subsequently, a second embodiment of the present invention will be described with reference to FIG. 14 and FIG. 15. The functional configuration of the walking assistance device according to this embodiment is the same as one in the first embodiment and the second embodiment differs only in a part of control processing from the first embodiment. Therefore, in the description of this embodiment, the same components or same functional elements as in the first embodiment are denoted by the same reference numerals as in the first embodiment, and their description is omitted. Further, this embodiment corresponds to the first embodiment and embodiments of the first to fourth inventions and the sixth invention of the present invention.

FIG. 14 is a block diagram showing functional means of the arithmetic processing unit 51 of the controller 50 in this embodiment. As shown, in this embodiment, there is provided an assist ratio setting key switch 70 (which corresponds to the desired assist ratio setting means in the present invention) for use in setting a desired assist ratio which is a desired value of a ratio with respect to the total treading force of an assisting force by the walking assistance device 1 out of the total treading force (the total sum of the treading force of the left leg and the treading force of the right leg) of the user A, instead of the lifting force setting key switch 53. The assist ratio setting key switch 70 is formed of a ten-key switch or a plurality of selector switches to permit direct setting of an intended desired value of an assist ratio or selective setting from among a plurality of types of desired values prepared beforehand.

Then, a control signal of the assist ratio setting key switch 70 (a set value of a desired assist ratio indicated by the control signal) is input to a left/right desired lifting force share determining means 71 of the arithmetic processing unit 51. In this embodiment, the functional means of the arithmetic processing unit 51 differs from the first embodiment only in the processing of the left/right desired lifting force share determining means 71, but the functional means of the arithmetic processing unit 51 other than the left/right desired lifting force share determining means 71 are the same in processing as those of the first embodiment. Therefore, the following description of this embodiment will focus on the processing of the left/right desired lifting force share determining means 71.

The left/right desired lifting force share determining means 71 according to this embodiment receives measurement values of the measuring means 60R, 60L, 61R, 61L, 62R, and 62L and control signals of the assist ratio setting key switch 70 and the lifting control ON/OFF switch 54. Then, the left/right desired lifting force share determining means 71 determines the control desired value of each leg link 3 (the desired value of a supporting force transmitted from the third joint 14 of each leg link 3 to the crus frame 13 or the desired value of a supporting force acting on the supporting force sensor 30 of the leg link 3) on the basis of the above input values.

The left/right desired lifting force share determining means 71 determines the control desired value of each leg link 3 as described below in each control processing cycle of the arithmetic processing unit 51. FIG. 15 is a block diagram showing the processing flow.

First, in S1301, the measurement value Fankle_R of the total lifting force share for the right leg link 3R and the measurement value Fankle_L of the total lifting force share for the left leg link 3L determined by the respective supporting force measuring means 62 are added to each other. Thereby, the total lifting force Fankle_t is calculated.

Subsequently, in S1302, an actual assist ratio which is a ratio of actually assisting force by the walking assistance device 1 out of the total treading force with respect to the total treading force is determined on the basis of a value obtained by subtracting an assistance device weight supporting force, which is described later, from the total lifting force Fankle_t and the total sum of the measurement values FRF_R and FRF_L of treading forces of the legs obtained by the treading force measuring means 60, in other words, the measurement value of the total treading force (FRF_R+FRF_L). More specifically, the above assistance device weight supporting force is considered to be a supporting force necessary to support the weight obtained by subtracting the total sum of the weight of the portions below the supporting force sensors 30 from the weight of the entire walking assistance device 1 (a supporting force balanced with the gravity corresponding to the weight) or a supporting force necessary to support the weight of the entire walking assistance device 1 (a supporting force balanced with the gravity corresponding to the entire weight), and the magnitude of the assistance device weight supporting force is stored and retained in a memory, which is not shown, beforehand. Then, a value obtained by subtracting the assistance device weight supporting force from the total lifting force Fankle_t (the value means an upward lifting force which is currently applied to the user A from the seat member 2) is divided by the measurement value of the total treading force (FRF_R+FRF_L). Thereby, the actual assist ratio is determined. In other words, the actual assist ratio is determined by a calculation: the actual assist ratio=(Fankle_t−the assistance device weight supporting force)/(FRF_R+FRF_L).

Subsequently, in S1303, one of the actual assist ratio and the set value of the desired assist ratio set through the assist ratio setting key switch 70 is selectively output according to the control signal of the lifting control ON/OFF switch 54 (a signal indicating whether the switch 54 is on or off). More specifically, if the lifting control ON/OFF switch 54 is off, the actual assist ratio determined in S1302 is selected and output. If the lifting control ON/OFF switch 54 is on, the set value of the desired assist ratio is selected and output.

Subsequently, the output in S1303 is passed through the low-pass filter in S1304, by which a practical desired assist ratio is determined as a desired assist ratio to be actually used. This low-pass filter in S1304 is for use in preventing a sudden change in the practical desired assist ratio and eventually a sudden change in the lifting force applied to the user A from the seat member 2 when the output in S1303 changes suddenly (when the set value of the desired assist ratio is changed, when the output in S1303 changes from the actual assist ratio to the set value of the desired assist ratio, or the like). The cutoff frequency of the low-pass filter is, for example, 0.5 Hz.

Subsequently, in S1305, the measurement value FRF_R of the treading force of the right leg of the user A determined by the right treading force measuring means 60R is multiplied by the practical desired assist ratio. This determines the right desired lifting force share which is a desired value of the share for the right leg link 3R out of the lifting force applied to the user A from the seat member 2. Similarly, in S1306, the measurement value FRF_L of the treading force of the left leg of the user A determined by the left treading force measuring means 60L is multiplied by the practical desired assist ratio. This determines the left desired lifting force share which is a desired value of the share for the left leg link 3L out of the lifting force applied to the user A from the seat member 2.

The processing of S1301 to S1306 corresponds to the desired lifting force share determining means in the fifth invention and the sixth invention.

Subsequently, in S1307, a distribution ratio, which is a ratio for distributing the assistance device weight supporting force to the left and right leg links 3, is determined on the basis of the magnitude of the measurement value FRF_R of the treading force of the right leg and the magnitude of the measurement value FRF_L of the treading force of the left leg that have been determined by the treading force measuring means 60. This processing in S1307 is the same as in S304 of FIG. 10 in the first embodiment.

Subsequently, in S1308, the assistance device weight supporting force is multiplied by the right distribution ratio determined in S1307. This provides a right desired device supporting force share, which is a desired value of the share for the right leg link 3R out of the assistance device weight supporting force. Similarly, in S1311, the assistance device weight supporting force is multiplied by the left distribution ratio determined in S1307. This determines a left desired device supporting force share, which is a desired value of the share for the left leg link 3L out of the assistance device weight supporting force. The processing of S1307, S1308, and S1311 can be performed in parallel with the processing of S1301 to S1306.

Subsequently, the processing of S1309 and S1310 related to the right leg link 3R and the processing of S1312 and S1313 related to the left leg link 3L are performed. In the processing of S1309 and S1310 related to the right leg link 3R, first, in S1309, the right desired device supporting force share obtained in S1308 is added to the right desired lifting force share obtained in S1305. This determines a provisional control desired value Tp_Fankle_R as a provisional value of the control desired value of the right leg link 3R. Then, the provisional desired value Tp_Fankle_R is passed through the low-pass filter in S1310, by which the control desired value T_Fankle_R of the right leg link 3R is obtained finally. The low-pass filter in S1309 is for use in removing noise components attributable to a variation of the knee angle θ1 or the like. The cutoff frequency is, for example, 15 Hz.

Similarly, in the processing of S1312 and S1313 related to the left leg link 3L, first in S1312, the left desired device supporting force share obtained in S1311 is added to the left desired lifting force share obtained in S1306. This determines a provisional control desired value Tp_Fankle_L as a provisional value of the control desired value of the left leg link 3L. Then, the provisional desired value Tp_Fankle_L is passed through the low-pass filter in S1313, by which the control desired value T_Fankle_L of the left leg link 3L is obtained finally.

The control desired value of each leg link 3 determined as described above means a desired value of the share for each leg link 3 out of the total sum of the assistance device weight supporting force and the overall lifting force applied to the user A from the seat member 2 (in other words, the total lifting force).

The above is the processing of the left/right desired lifting force share determining means 71 in this embodiment.

Supplementarily, the processing of calculating the left and right desired lifting force shares in S1305 and S1306 is equivalent to distributing the force, which is obtained by multiplying the total sum of the measurement values FRF_R and FRF_L of the treading forces of the left and right legs of the user A by the practical desired assist ratio (which corresponds to the desired value of the overall lifting force applied to the user A from the seat member 2), to the left and right leg links 3 according to the right distribution ratio and the left distribution ratio.

The processing of S1307, S1308, and S1311 corresponds to the distribution means in the fifth invention and the sixth invention. Further, the processing of S1309, S1310, S1312, and S1313 corresponds to the force-to-be-controlled desired value determining means in the sixth invention.

In the second embodiment described above, the line of action of the supporting force (translational force) transmitted from the third joint 14 to the crus frame 13 of each leg link 3 is the straight line which passes through the forward/backward swing central point P that exists above the seat member 2 within the width in the anteroposterior direction of the contact surface between the seat member 2 and the user A from the central point of the third joint 14. Moreover, each leg link 13 is free to swing in the forward/backward direction with respect to the seat member 2 with the forward/backward swing central point P as a fulcrum. Therefore, similarly to the first embodiment, it is possible to prevent the seat member 2 from being displaced with respect to the user A or the like so as to allow the seat member 2 to be stable in position and posture. Consequently, an intended lifting force can be applied to the user A from the seat member 2 stably and appropriately.

Further, a desired value of an overall lifting force to be applied to the user A from the seat member 2 is distributed to the left and right leg links 3L and 3R so as to be associated with the ratio between the treading force of the right leg and the treading force of the left leg of the user A, and the assistance device weight supporting force for supporting the weight of the entire walking assistance device 1 is distributed to the left and right leg links 3L and 3R so as to be associated with the ratio between the treading force of the right leg and the treading force of the left leg of the user A. This determines the control desired value which is a desired value of the total lifting force share for each leg link 3, by which the supporting force of the control desired value is generated in each leg link 3. Therefore, particularly, in the state where the lifting control ON/OFF switch 54 is on, the lifting force corresponding to the assist ratio set through the key switch 70 can be applied to the user A from the seat member 2 smoothly and stably, by which the load on each leg of the user A can be effectively reduced.

Further, in the state where the lifting control ON/OFF switch 54 is off, the actual assist ratio is determined as a practical desired assist ratio. Therefore, in this state, it is possible to maintain the seat member 2 and the user A in a balanced state where no acting force is generated between them while the seat member 2 is in contact with the user A, unless the user A intentionally applies his/her weight to the seat member 2. In this state, when the lifting control ON/OFF switch 54 is turned on, a lifting force can be smoothly applied to the user A while preventing a lifting force from being suddenly applied to the user A from the seat member 2 by the low-pass filter (see S1304 in FIG. 15).

Moreover, the indicator current values of the electric motors 27 are determined according to the PD control law (the feedback control law) and the feedforward control law in combination, thus permitting quick and stable lifting force control, similarly to the first embodiment.

In the second embodiment, the spring restoring force described in the first embodiment has not been added to each of the control desired values T_Fankle_L and T_Fandle_R. Alternatively, however, the spring restoring force of each leg link 3 can be determined and added to each of the control desired values T_Fankle_L and T_Fandle_R.

Further, in the first and second embodiments, the operation control has been performed for the electric motors 27R and 27L also in the state where the lifting control ON/OFF switch 54 is off. Alternatively, however, in the state where the switch 54 is off, the output to each driver circuit 52 can be stopped to stop the energization to each electric motor 27 while the arithmetic processing unit 51 performs calculation. This generates a lifting force corresponding to a slight force (or zero) which has been applied to the seat member 2 from the user A at the moment when the lifting control ON/OFF switch 54 is turned on. Then, thereafter until the final total lifting force is applied, a state transition from the generation of the lifting force to the increase thereof can be very smoothly achieved with a reduction of an impact to the user A due to the effect of the low-pass filter (see S303 in FIG. 1). In addition, power consumption of the electric motors 27 can be reduced when the switch 54 is off.

Further, although the receiving portion has been formed of a saddle-shaped seat member 2 in the first and second embodiments, it can also be formed of a flexible member, for example. This instance will be described below as a third embodiment. In the third embodiment, for example, as shown in FIG. 16, a belt 100 is wound around the waist of the user A (the belt 100, however, need not be completely secured to the user A), with two harness-shaped flexible members 101L and 101R hung at the lower ends of the belt 100 as receiving portions. The flexible members 101R and 101L are secured at one end thereof to the belt 100 on the front side of the user A and at the other end to the belt 100 on the rear side of the user A. Then, the flexible member 101R passes the inside of the root of the right leg of the user A so as to be contacted by the crotch of the user A, while the flexible member 101L passes the inside of the root of the left leg of the user A so as to be contacted by the crotch of the user A. This causes the crotch portion of each of the flexible members 101R and 101L to function as a receiving portion which receives a part of the weight of the user A from above. Moreover, the thigh frame 11 of each leg link 3 is extended so that it can swing at least in the forward/backward direction (swing with the first joint 102 as a fulcrum) via the first joint 102 provided in each of the left and right sides of the belt 100. In this case, when viewed in the sagittal plane, the swing central point (the predetermined point in the present invention) exists above the receiving portions of the flexible members 101R and 101L. The configuration of the components below the thigh frame 11 of each leg link 3 can be the same as in the first embodiment and the second embodiment. The actuator which drives the second joint is attached to, for example, the second joint concerned.

Moreover, although the table shown in FIG. 7 has been used in each treading force measuring means 60 in the first and second embodiments, the provisional measurement value FRF_p of the treading force of each leg can be converted to a measurement value FRF by using, for example, a table shown in FIG. 17. This instance will be described below as a fourth embodiment. In the table shown in FIG. 17 in the fourth embodiment, an FRF takes a negative value if a provisional measurement value FRF_p is smaller than a threshold value FRF1. More specifically, according to the table shown in FIG. 17, if the FRF_p takes a value between the threshold value FRF1 and a threshold value FRF3 (FRF3>0 in this example), which is slightly smaller than the FRF1, then the FRF linearly decreases as the FRF_p decreases: if the FRF_p further decreases to be smaller than the threshold value FRF3 (including a case where FRF_p<0), then the FRF is maintained at a negative constant value (the value of FRF when FRF_p=FRF3.)

While the user A is walking, for example, if the right leg is lifted, then the outputs of the MP sensor 38R and the heel sensor 39R will be extremely small values (values in the vicinity of zero) or negative values, causing the provisional measurement value FRF_p_R to be smaller than the threshold value FRF1. At this time, the measurement value FRF_R of the treading force of the right leg obtained using the table shown in FIG. 17 takes a negative value.

Further, if the measurement value FRF_R of a negative value is obtained using the table shown in FIG. 17, then a part of the processing shown in FIG. 10 (the processing of the left/right desired lifting force share determining means 63) is changed, for example, as described below in the first embodiment. If the measurement value FRF_R of a negative value is obtained in S304 of FIG. 10, then the ratio between the two distribution ratios is set to a predetermined ratio established beforehand. For example, if FRF_R<0, as described above, the left distribution ratio to the right distribution ratio is set to 1.1 to −0.1. In other words, of the left distribution ratio and the right distribution ratio, the distribution ratio associated with the FRF of a negative value is set to a predetermined negative value (−0.1 in this embodiment), while the other distribution ratio is set to a predetermined positive value (1.1 in this embodiment). These predetermined values are preferably determined beforehand so that the sum of the left and right distribution ratios is 1. Then, the distribution ratios are used to perform the processing of S306 and S311. At this time, if, for example, the desired total lifting force, which is an output of S303 shown in FIG. 10, is 200 N, then the outputs of S306 and S311 are 20 N and 220 N, respectively. A leg for which the provisional measurement value FRF_p that is smaller than the threshold value FRF1 has been obtained (the right leg in the above example) is determined as a free leg, and the processing of calculating a spring restoring force for the free leg in S305 or S310 is not performed (the spring restoring force associated with the free leg is set to zero). With this arrangement, at the start of a one-leg supporting period (a period in which only one leg is standing), the second joint 12 of the leg link 3 of the free leg is driven to bend, making it possible to assist the user A in lifting the free leg.

Similarly, in the second embodiment, a part of the processing (the processing of the left/right desired lifting force share determining means 71) in FIG. 15 is changed, for example, as described below. If the measurement value FRF_R of a negative value is obtained in S1307 of FIG. 15, as described above regarding the first embodiment, the distribution ratio associated with the FRF of a negative value out of the left and right distribution ratios is set to a predetermined negative value (for example, −0.1), while the other distribution ratio is set to a predetermined positive value (for example, 1.1) (preferably, the left distribution ratio+the right distribution ratio=1). Then, the distribution ratios are used to perform the processing of S1308 and S1311. With this arrangement, similarly to the case described regarding the first embodiment, at the start of a one-leg supporting period (a period in which only one leg is standing), the second joint 12 of the leg link 3 of the free leg is driven to bend, making it possible to assist the user A in lifting the free leg.

In the embodiments described above, the first force sensor is composed of the MP sensor 38 and the heel sensor 39, these sensors 38 and 39 being provided in the foot attachment portions 15 so that they are located between the sole of the foot of a standing leg of the user A and a floor, as shown in FIG. 3. The mounting position of the first force sensor, however, is not limited thereto. The first force sensor can alternatively be provided in the foot attachment portion as shown in, for example, FIG. 18. This case will be described below as a fifth embodiment.

Referring to FIG. 18, in the fifth embodiment, a foot supporting member 100 is provided inside the annular member 36 of a foot attachment portion 15. The foot supporting member 100 shaped like a slipper is composed of a plate-like foot sole member 101 (a member like an insole of a shoe) that comes in contact with substantially the entire sole of a foot of a user A and an arched member 102 (a member having a cross section of an approximately semicircular arc shape) that is connected to the foot sole member 101. The arched member 102 has its both lower ends connected integrally with both sides of the foot sole member 101. The toe portion of a foot of the user A can be inserted in the arched member 102. With the toe portion inserted therein, the foot is supported on the foot sole member 101. The foot sole member 101 and the arched member 102 are formed of a material such as, for example, a metal or resin, having a predetermined rigidity.

Further, a tensile force sensor 103 constituting a first force sensor is provided between the outer surface of the top of the arched member 102 and the inner surface of the top of the annular member 36. The tensile force sensor 103 is connected to the arched member 102 and the annular member 36. The tensile force sensor 103 is formed of, for example, a tensile load cell. In this case, the foot supporting member 100 is disposed inside the annular member 36 so that it is in contact with neither the annular member 36 nor the shoe 35. With this arrangement, the foot supporting member 100 is suspended in the annular member 36 through the tensile force sensor 103 so that a force for supporting the foot supporting member 100 from under acts from neither the annular member 36 nor the shoe 35.

A cushion for protecting the foot of the user A can be provided on the upper surface of the foot sole member 101 or the inner surface of the arched member 102.

The above is the structure of the foot attachment portion 15 in this embodiment. The foot attachment portion 15 in this embodiment does not have the MP sensor 38, the heel sensor 39, and the insole member 37. To attach the foot attachment portion 15 of this embodiment to each foot of the user A, the toe portion of the foot is inserted in the arched member 102 of the foot supporting member 100, and the foot is inserted into the shoe 35 through the top opening of the shoe 35, placing the foot on the foot sole member 101.

In the walking assistance device of this embodiment having the foot attachment portion 15 constructed as described above, the treading force of a leg of the user A that is a standing leg is detected by the tensile force sensor 103 as a tensile force acting on the tensile force sensor 103.

In this embodiment, outputs of the tensile force sensors 103 of the left and right foot attachment portions 15, instead of outputs of the MP sensor 38 and the heel sensor 39, are supplied to treading force measuring means 60 of an arithmetic processing unit 51. Each of the treading force measuring means 60 obtains a force detected value, which is represented by an output of the tensile force sensor 103 associated therewith (the tensile force taking a positive value) and which has been passed through a low-pass filter, as the provisional measurement value FRF_p of each leg of the user A. Further, each treading force measuring means 60 determines the measurement value FRF of a treading force according to the table shown in FIG. 7 (or the table shown in FIG. 17) from the provisional measurement value FRF_p.

The configuration and processing other than those explained above are the same as those of the first embodiment (or the second embodiment) described above.

INDUSTRIAL APPLICABILITY

As described hereinabove, the present invention is useful because it is capable of appropriately assisting a user in walking.

Figure 1:
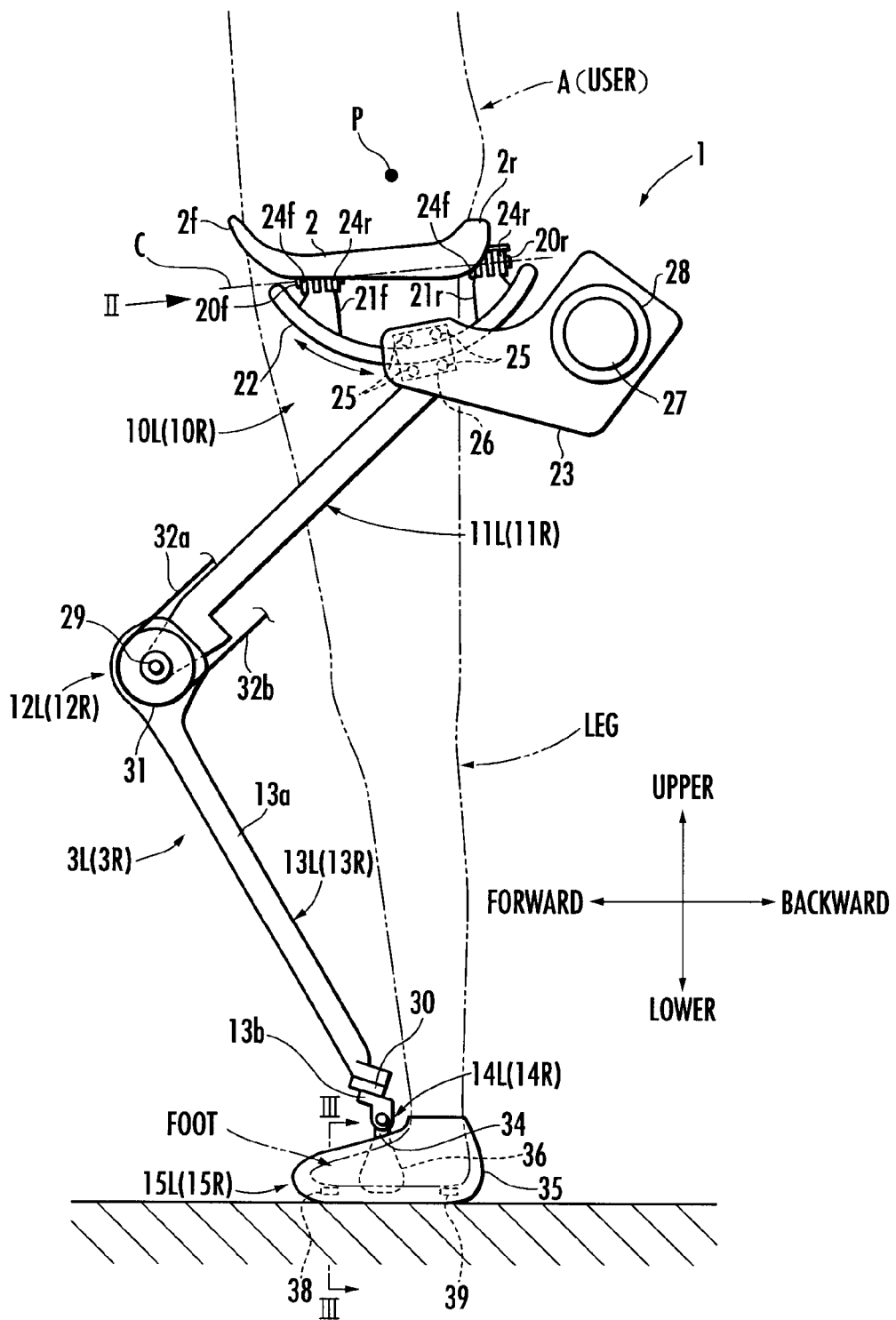
FIG. 1 is a side view (diagram viewed in the sagittal plane) of a walking assistance device according to a first embodiment of the present invention.
Figure 2:
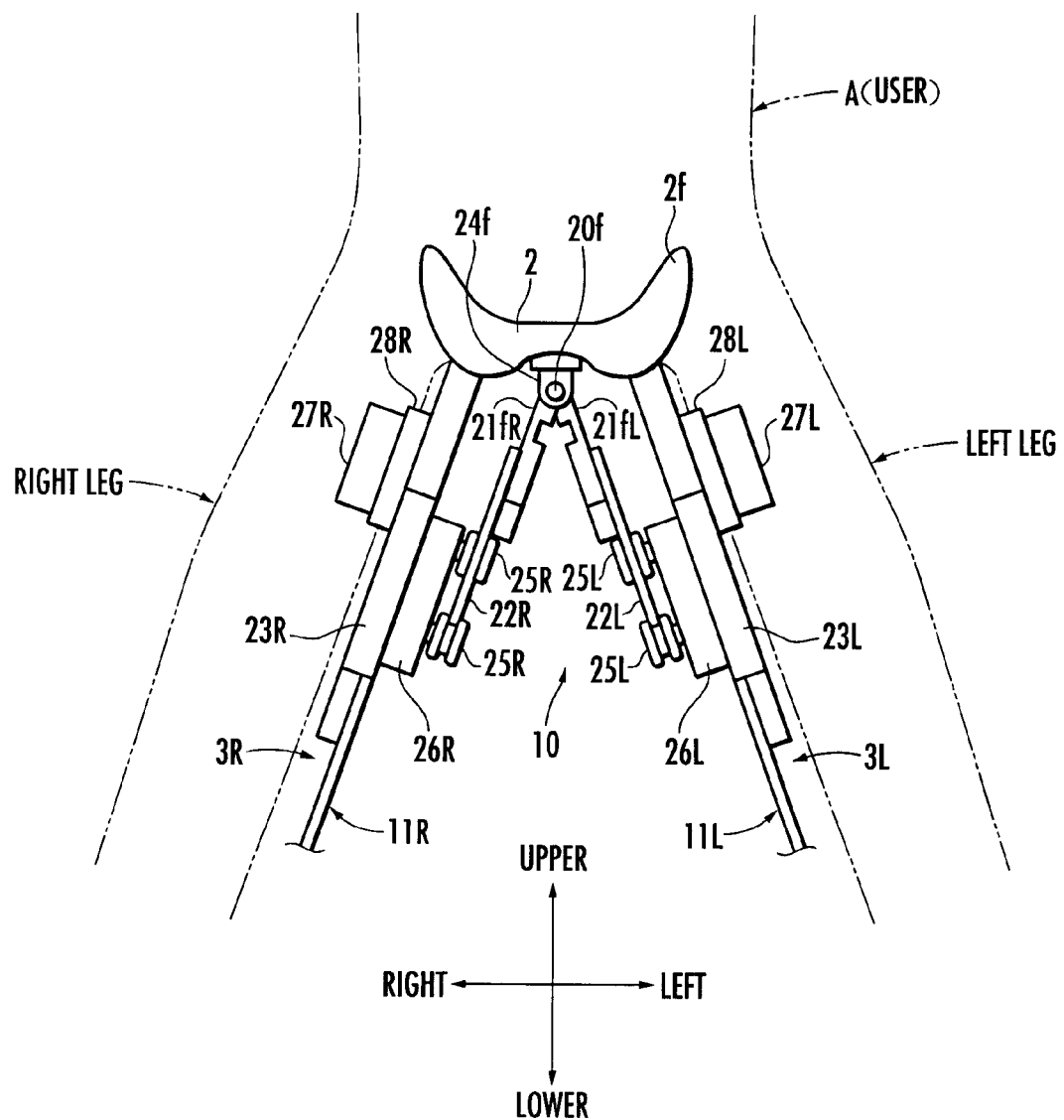
FIG. 2 is a view on arrow taken along line II in FIG. 1.
Figure 3:
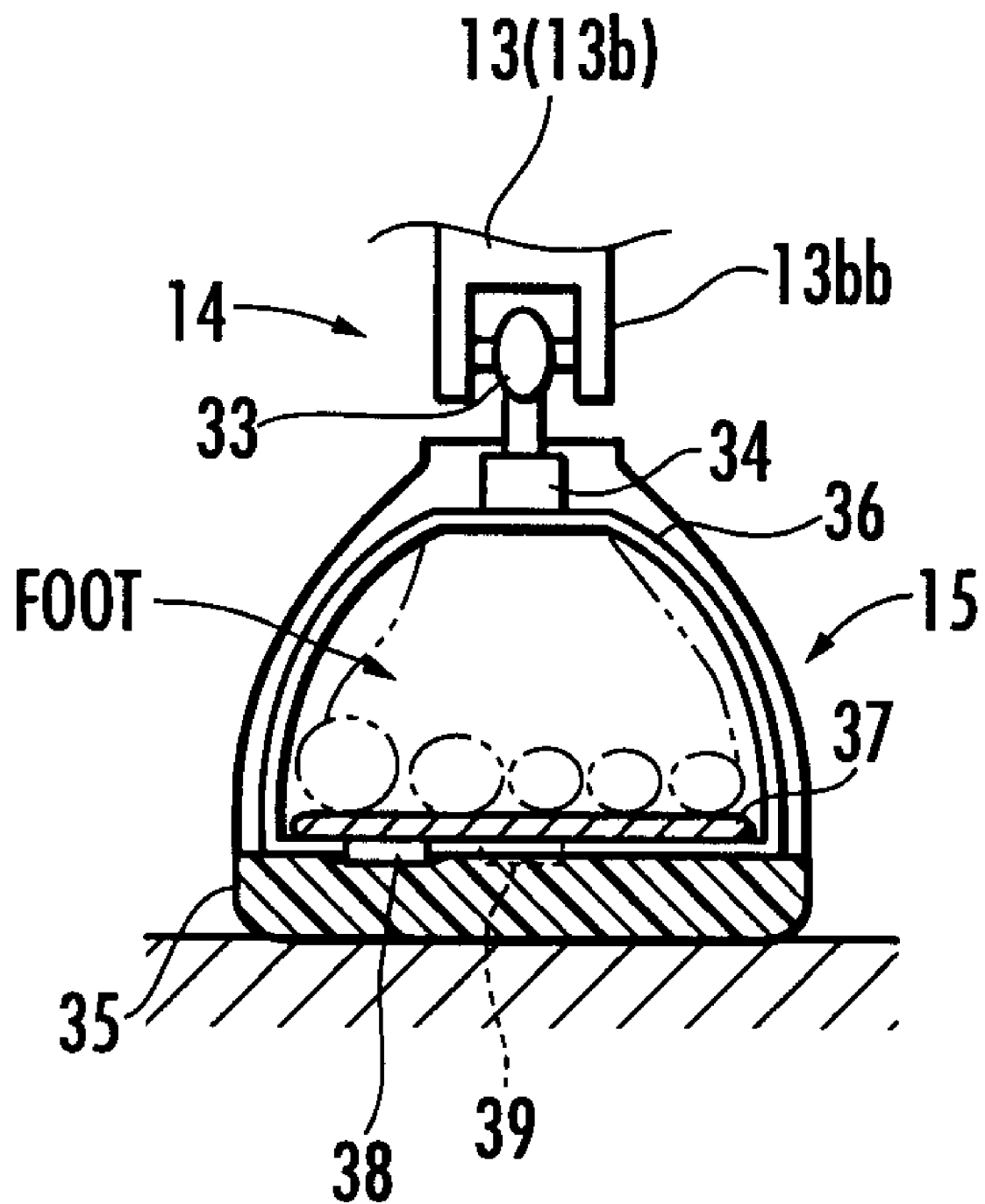
FIG. 3 is a sectional view taken along line III-III in FIG. 1.
Figure 4:
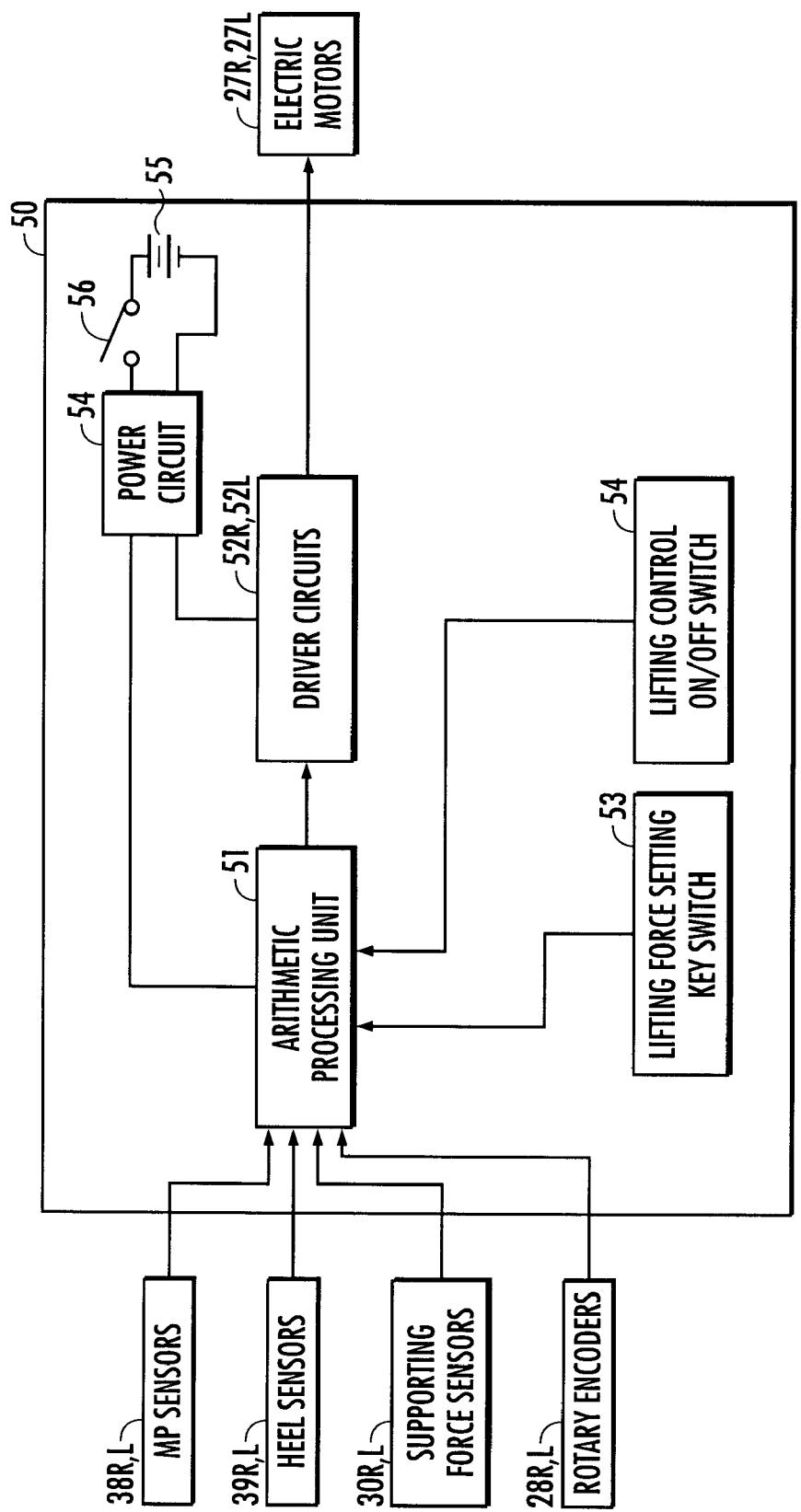
FIG. 4 is a block diagram schematically showing a configuration (hardware configuration) of a controller for the walking assistance device according to the first embodiment in FIG. 1.
Figure 5:
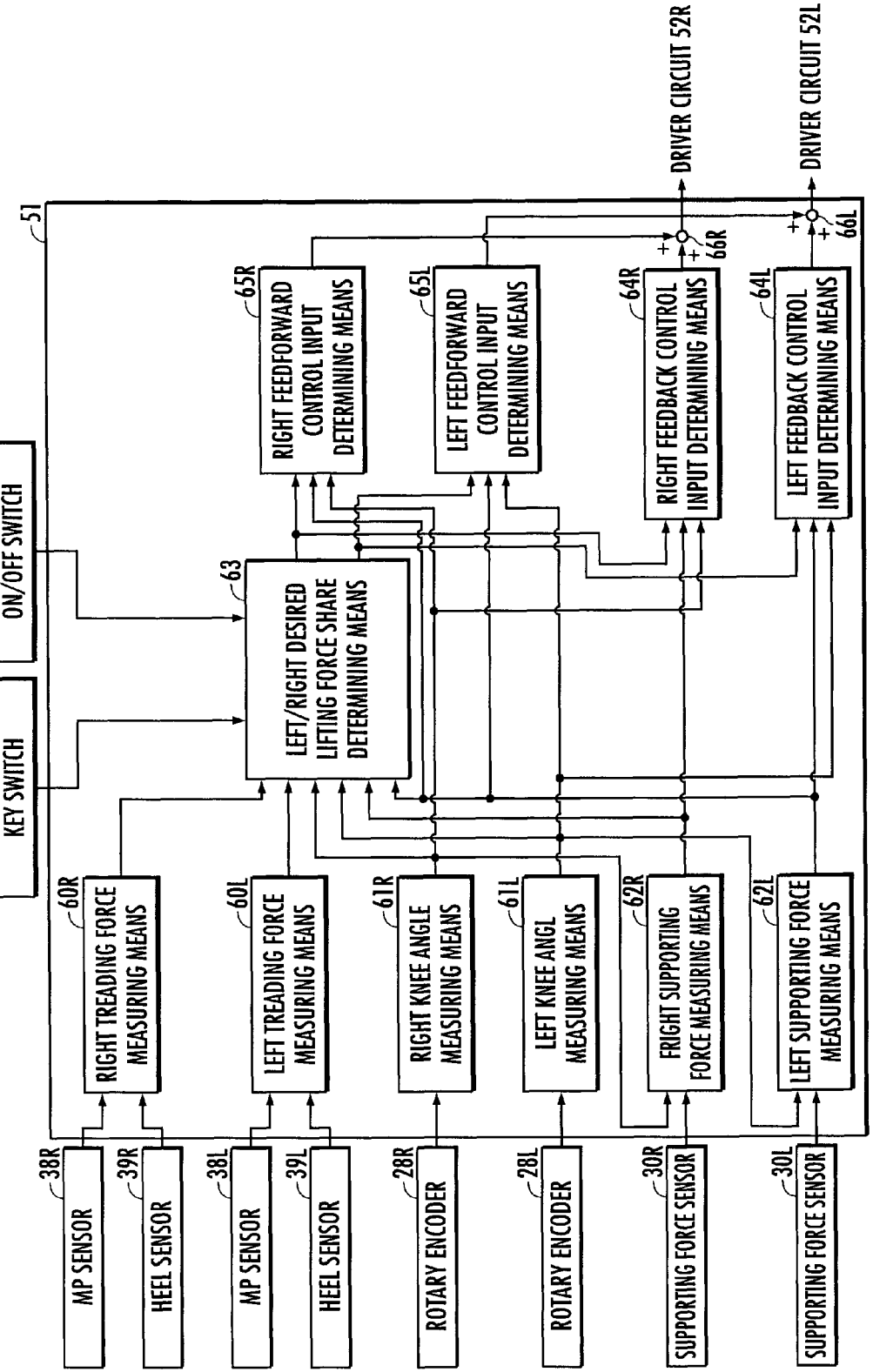
FIG. 5 is a block diagram showing a functional configuration of an arithmetic processing unit provided in the controller in the first embodiment.
Figure 6:
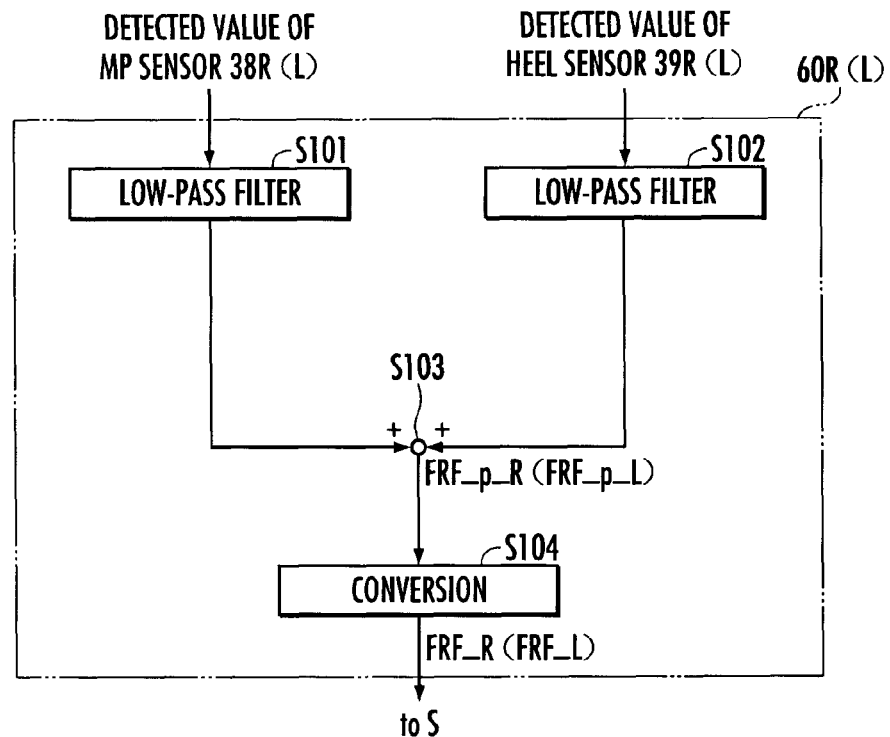
FIG. 6 is a block diagram showing a processing flow of treading force measuring means in FIG. 5.
Figure 7:
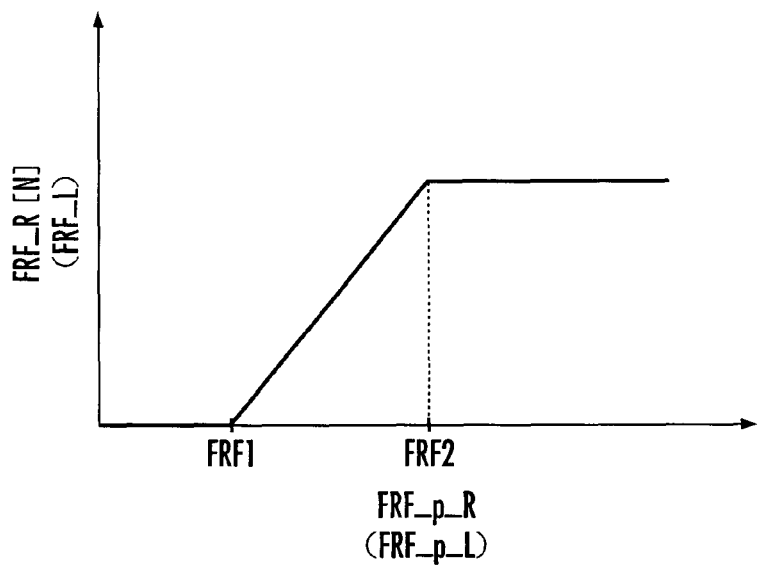
FIG. 7 is a graph showing a table used in processing of S104 in FIG. 6.
Figure 8:
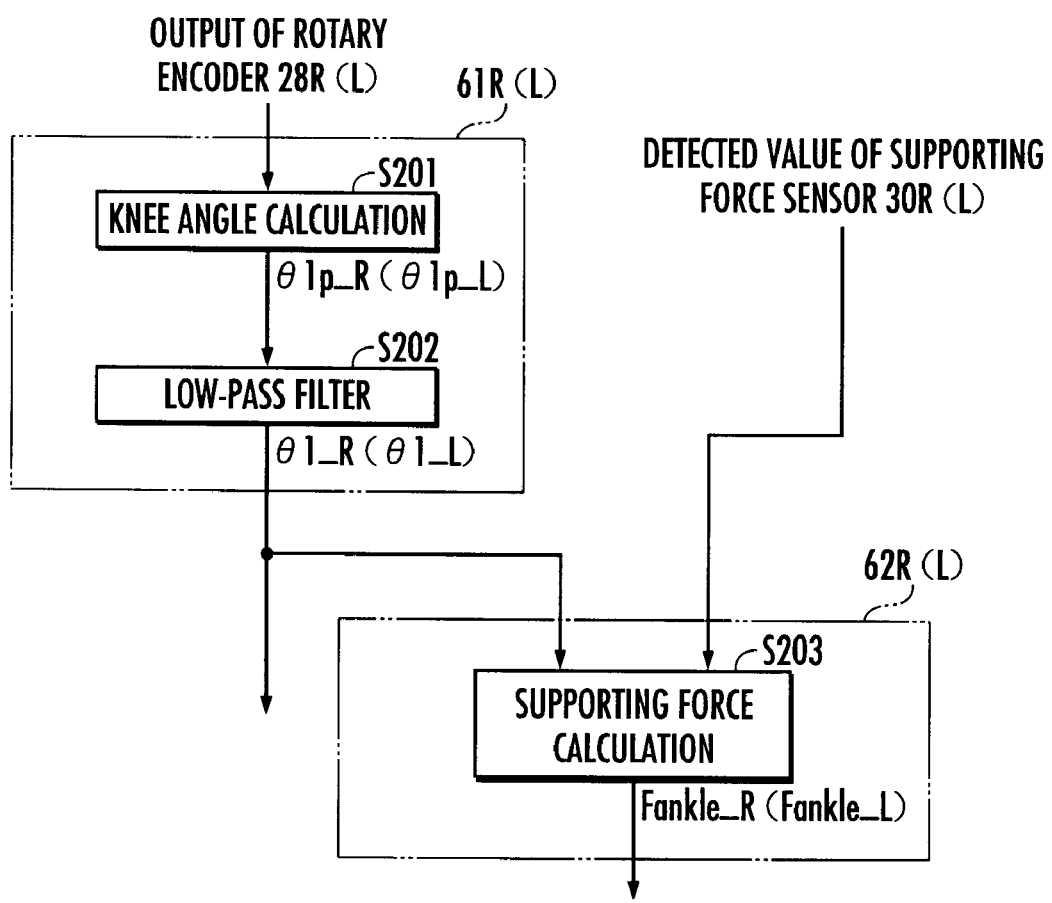
FIG. 8 is a block diagram showing a processing flow of knee angle measuring means and that of supporting force measuring means in FIG. 5.
Figure 9:
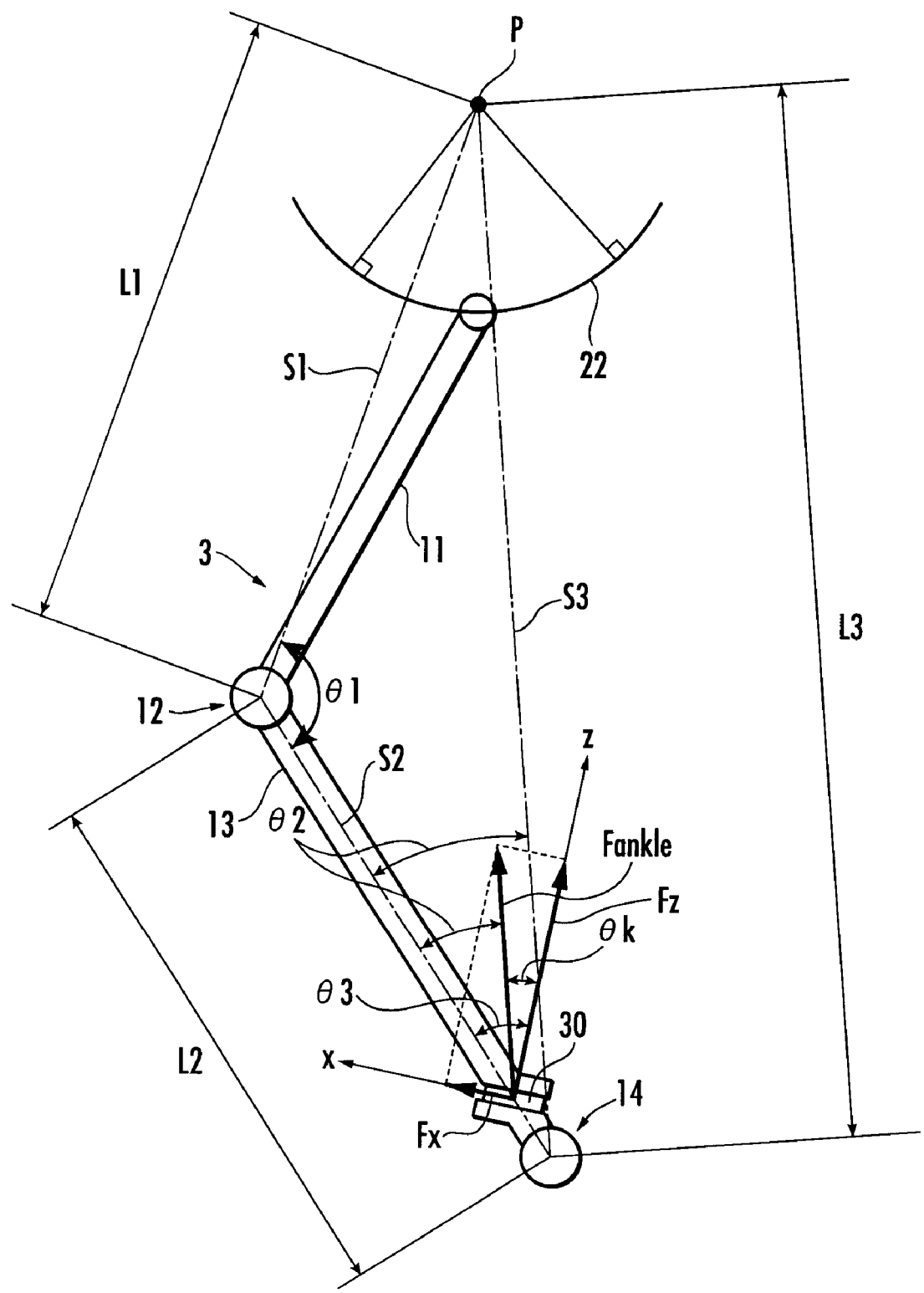
FIG. 9 is a diagram for explaining the processing of S201 and S203 in FIG. 8.
Figure 10:
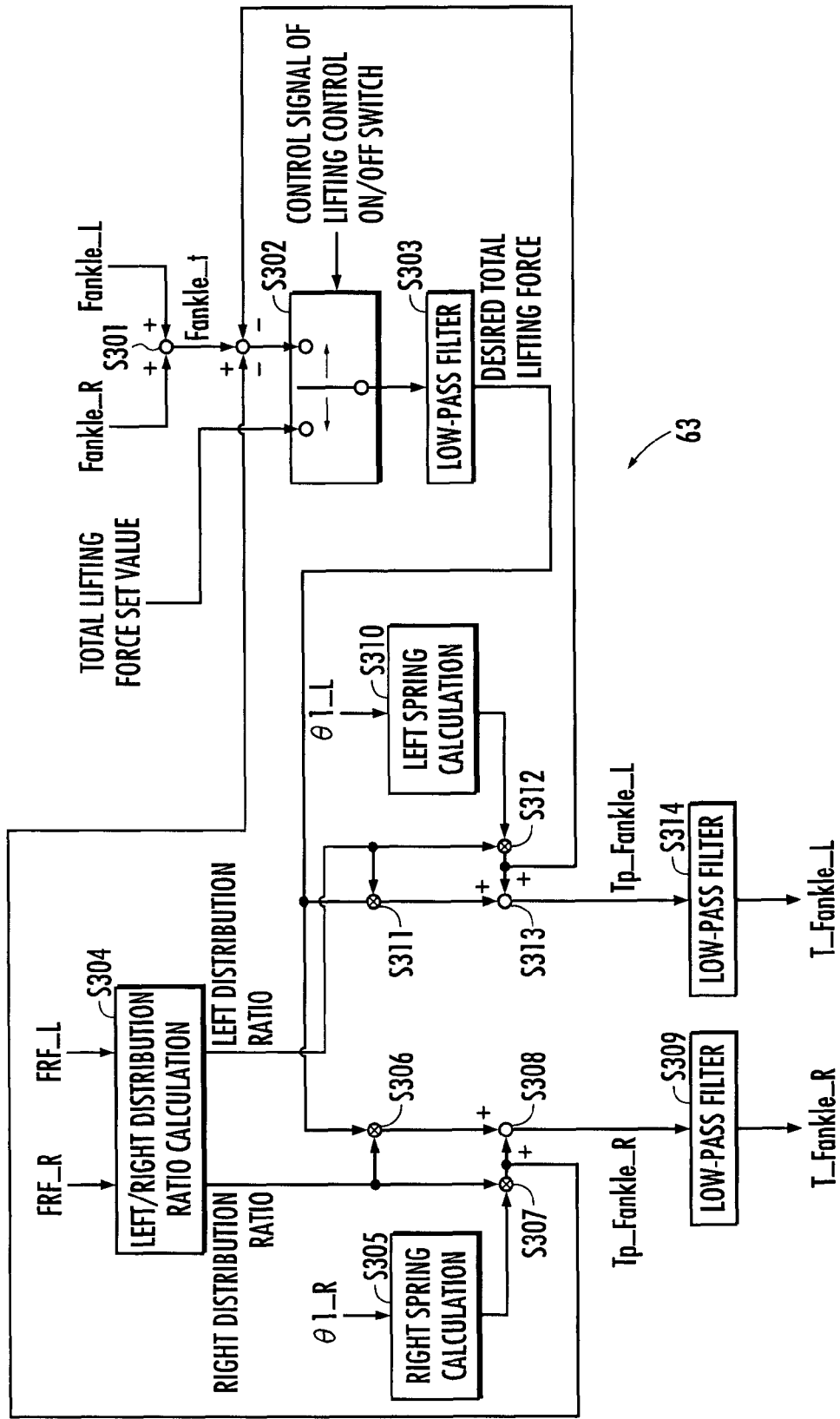
FIG. 10 is a block diagram showing a processing flow of left and right desired lifting force share determining means.
Figure 11:
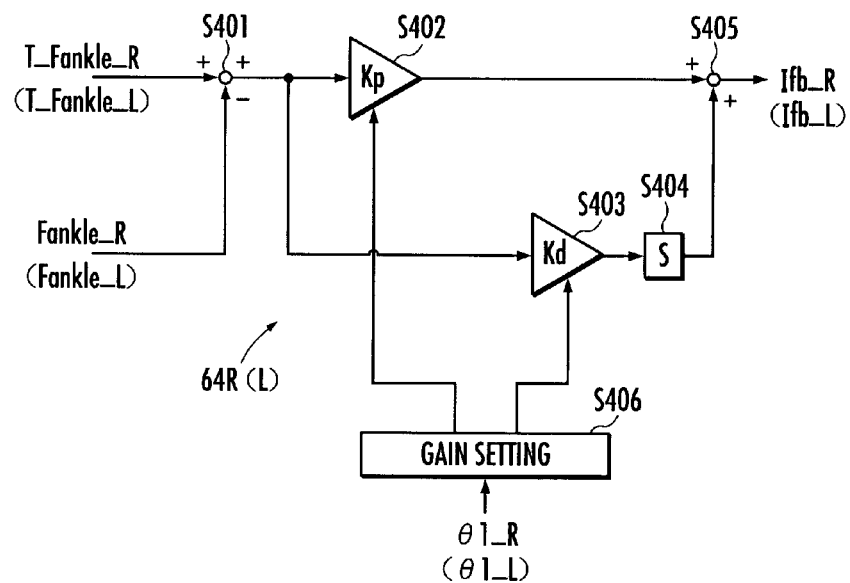
FIG. 11 is a block diagram showing a processing flow of feedback control input determining means in FIG. 5.
Figure 12:
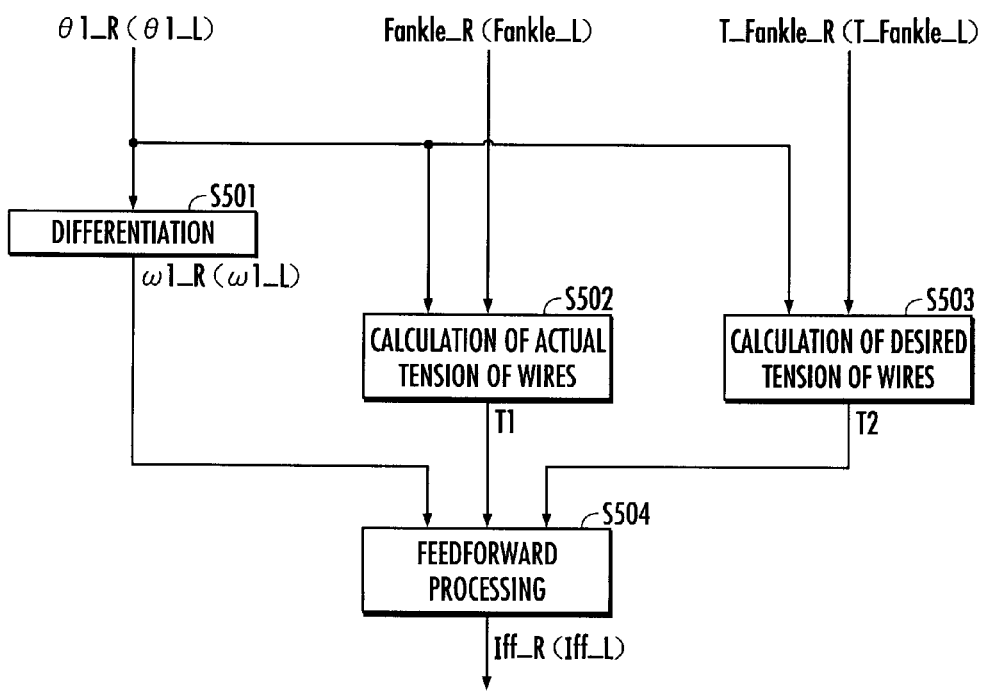
FIG. 12 is a block diagram showing a processing flow of feedforward control input determining means in FIG. 5.
Figure 13:
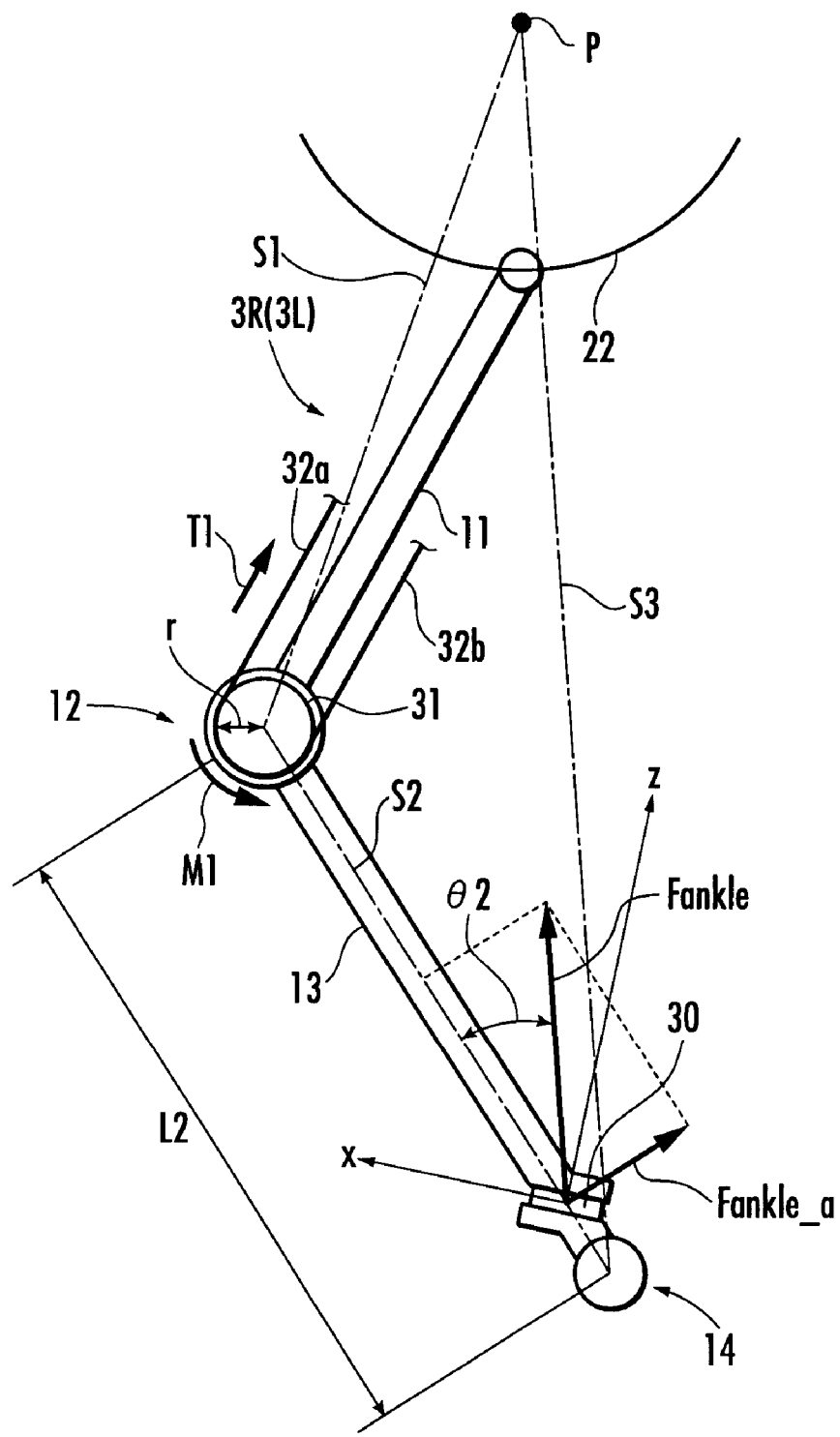
FIG. 13 is a diagram for explaining processing of S502 in FIG. 12.
Figure 14:
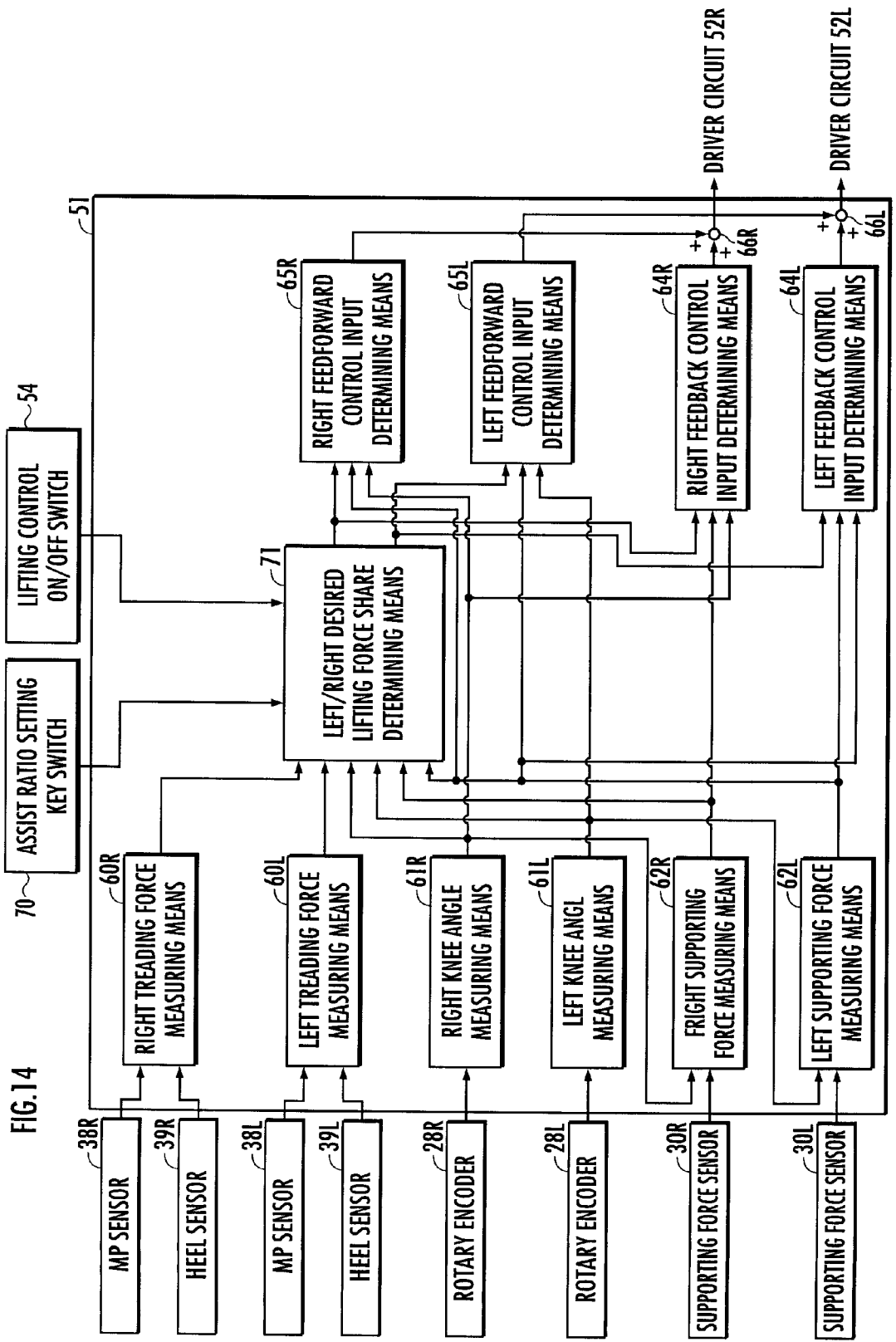
FIG. 14 is a block diagram showing a functional configuration of an arithmetic processing unit provided in a controller for a walking assistance device according to a second embodiment of the present invention.
Figure 15:
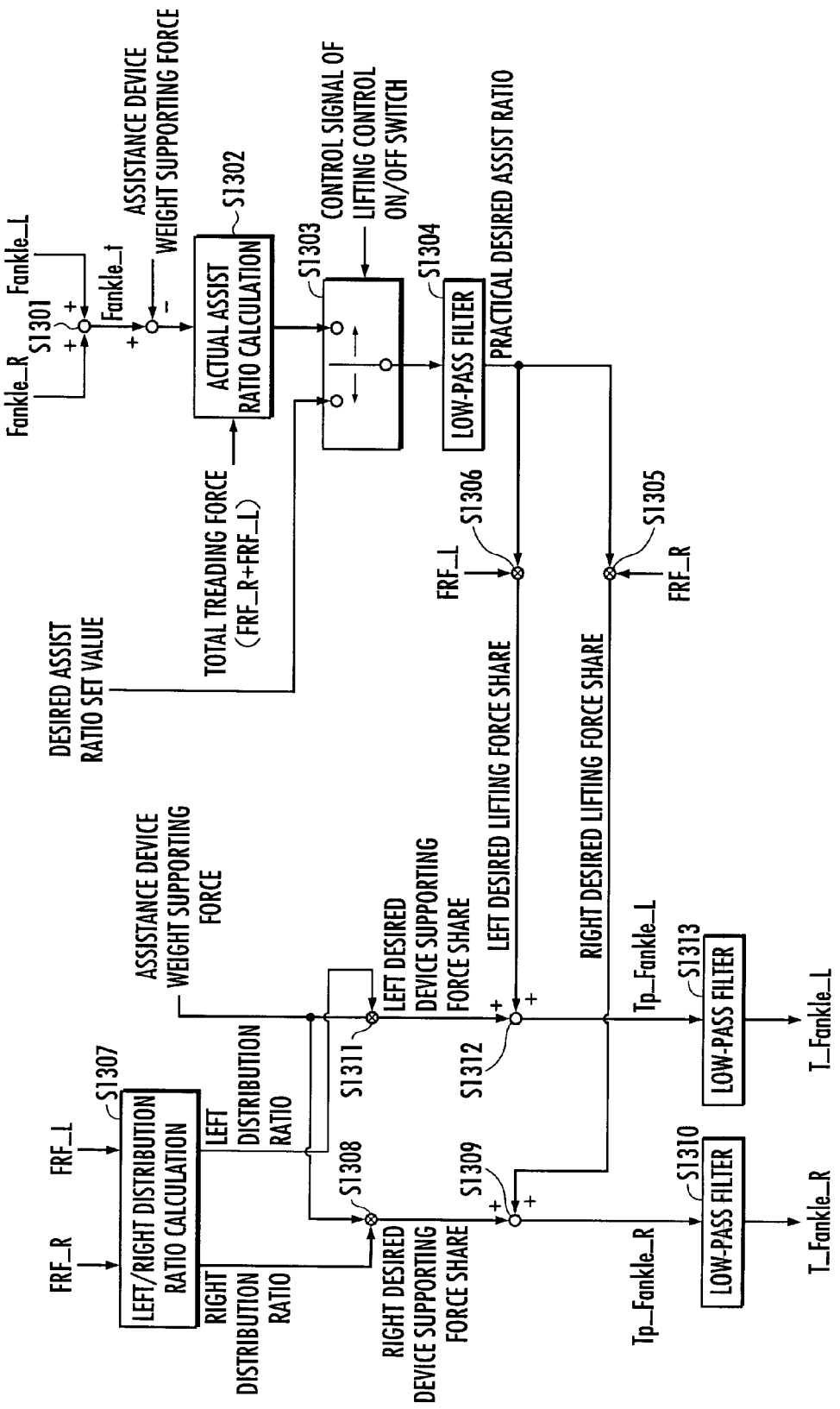
FIG. 15 is a block diagram showing a processing flow of left and right desired lifting force share determining means in FIG. 14.
Figure 16:
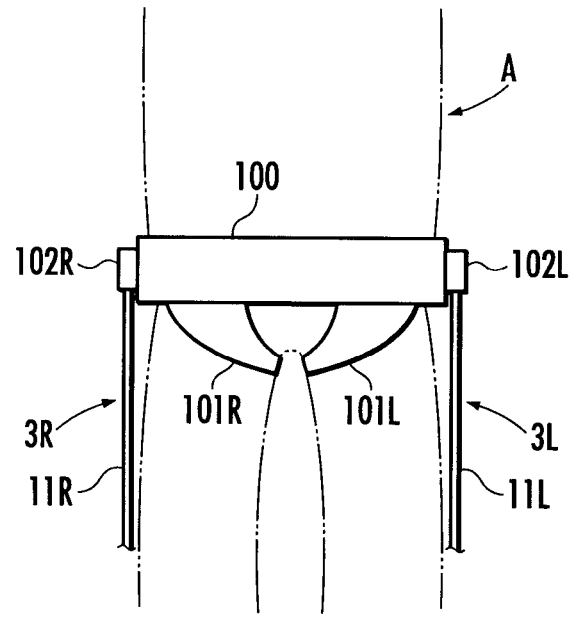
FIG. 16 is a diagram for explaining a configuration example of a receiving portion in a third embodiment of the present invention.
Figure 17:
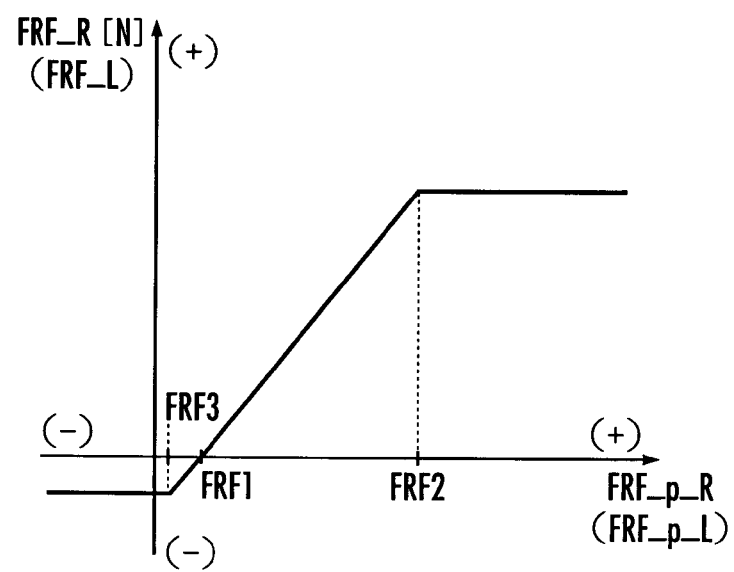
FIG. 17 is a graph showing an example of a table used in processing of S104 in FIG. 6 in a fourth embodiment of the present invention.
Figure 18:
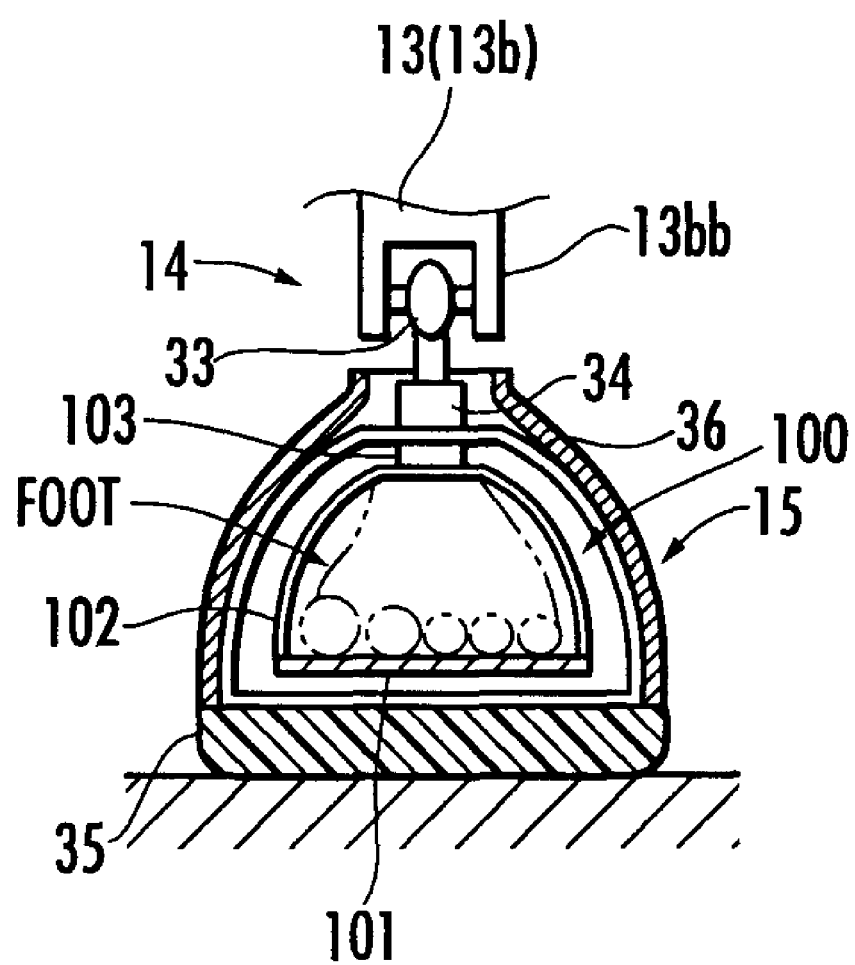
FIG. 18 is a diagram showing a configuration of a foot attachment portion in a fifth embodiment of the present invention.

The invention claimed is:

1. A walking assistance device having: a receiving portion configured to be disposed between the root of both legs of a user so as to receive a part of the weight of the user from above; a pair of left and right thigh frames respectively connected to the receiving portion through first joints; a pair of left and right crus frames respectively connected to the thigh frames through second joints; a pair of left and right foot attachment portions that are respectively connected to the crus frames through third joints and respectively attached to the feet of the left and right legs of the user and that come in contact with the ground when the legs of the user are standing legs; an actuator for the left which drives the second joint among the joints of a left leg link composed of the first joint, the thigh frame, the second joint, the crus frame, the third joint, and the foot attachment portion on the left side; and an actuator for the right which drives the second joint among the joints of a right leg link composed of the first joint, the thigh frame, the second joint, the crus frame, the third joint, and the foot attachment portion on the right side; the second joints of the leg links being driven by the actuators so that upward lifting forces are applied to the user from the receiving portion, wherein:

the first joint of each leg link is a joint that connects the thigh frame of the leg link and the receiving portion in such a way that the leg link is free to swing at least in the forward/backward direction with a forward/backward swing central point being a predetermined point located above the receiving portion and within the anteroposterior width of a contact surface between the receiving portion and the user from the third joint, each leg link is connected to the receiving portion so that a line of action of a supporting force applied to the crus frame from the third joint of the leg link corresponding to a standing leg passes through the predetermined point, when the leg link is viewed in the sagittal plane of the user; and the walking assistance device comprises means which applies the lifting forces to the user by controlling the actuators so that forces to be controlled reach predetermined desired values for the respective leg links with the supporting forces as the forces to be controlled.

2. A walking assistance device according to claim 1, wherein the first joint of each leg link is a joint that connects the thigh frame of the leg link and the receiving portion in such a way that the leg link is free to swing in the forward/backward direction and in the left/right direction.

3. A walking assistance device according to claim 1, wherein the actuator for the left and the actuator for the right are connected to the thigh frames at places closer to the receiving portion than the second joints, respectively, and wherein the walking assistance device further comprises a pair of left and right power transmission elements configured to transmit driving forces of the actuators to the second joints, respectively.

4. A walking assistance device according to claim 1, wherein the first joint is connected to the receiving portion so as to be disposed between the root of both legs of the user.

5. A walking assistance device according to claim 1, wherein each leg link is connected to the receiving portion so that the line of action of the supporting force applied to the crus frame from the third joint of the leg link corresponding to the standing leg extends between the third joint and the predetermined point when the leg link is viewed in the sagittal plane of the user.

6. A walking assistance device according to claim 1, wherein the first joints each comprise an arc-shaped guide rail secured to a lower side of the receiving portion, and the left and right thigh frames are each secured to the respective arc-shaped guide rail via a slider, and the predetermined point is a central point of an arc defined by the arc-shaped guide rails.

7. A walking assistance device according to claim 6, wherein the arc-shaped guide rails are secured to the lower side of the receiving portion via pivot pins, the pivot pins being configured to allow each of the leg links to swing in the left/right direction.

8. A walking assistance device having: a receiving portion configured to be disposed between the root of both legs of a user so as to receive a part of the weight of the user from above; a pair of left and right thigh frames respectively connected to the receiving portion through first joints; a pair of left and right crus frames respectively connected to the thigh frames through second joints; a pair of left and right foot attachment portions that are respectively connected to the crus frames through third joints and respectively attached to the feet of the left and right legs of the user and that come in contact with the ground when the legs of the user are standing legs; an actuator for the left which drives the second joint among the joints of a left leg link composed of the first joint, the thigh frame, the second joint, the crus frame, the third joint, and the foot attachment portion on the left side; and an actuator for the right which drives the second joint among the joints of a right leg link composed of the first joint, the thigh frame, the second joint, the crus frame, the third joint, and the foot attachment portion on the right side; the second joints of the leg links being driven by the actuators so that upward lifting forces are applied to the user from the receiving portion, wherein:

each leg link is connected to the receiving portion so that a line of action of a supporting force applied to the crus frame from the third joint of the leg link corresponding to a standing leg passes through a predetermined point located upper than the receiving portion within the anteroposterior width of a contact surface between the receiving portion and the user from the third joint, when the leg link is viewed in the sagittal plane of the user; and the walking assistance device comprises means which applies the lifting forces to the user by controlling the actuators so that forces to be controlled reach predetermined desired values for the respective leg links with the supporting forces as the forces to be controlled, the walking assistance device further comprising:

treading force measuring element configured to measure a treading force of each leg of the user on the basis of a force detected value indicated by an output of a first force sensor provided in each of the foot attachment portions;

desired lifting force setting element configured to set a desired lifting force, which is a desired value of an upward lifting force to be applied to the user from the receiving portion;

a second force sensor which is inserted between a lower end of the crus frame of each leg link and the third joint thereof or between the third joint of each leg link and the foot attachment portion thereof;

force-to-be-controlled measuring element configured to measure the supporting force actually applied to the crus frame from the third joint of each leg link as a force to be controlled on the basis of the force detected value indicated by an output of the second force sensor;

total desired lifting force determining element configured to determine the total sum of the desired lifting force and a supporting force for supporting the weight obtained by subtracting the total weight of the portions below the second force sensors from the weight of the entire walking assistance device out of the walking assistance device on the floor or the total sum of the desired lifting force and a supporting force for supporting the weight of the entire walking assistance device on the floor as the total desired lifting force;

distribution element configured to determine a desired share for the left leg link and a desired share for the right leg link out of the total desired lifting force by distributing the total desired lifting force to the leg links on the basis of the ratio between the treading force of the left leg and the treading force of the right leg of the user; and actuator control element configured to control the actuator for the left so that a difference between the force to be controlled for the left leg link and the desired share therefor approaches zero on the basis of the force to be controlled for the left leg link and the desired share for the left leg link and which controls the actuator for the right so that a difference between the force to be controlled for the right leg link and the desired share therefor approaches zero on the basis of the force to be controlled for the right leg link and the desired share for the right leg link.

9. A walking assistance device according to claim 8, wherein the first joint of each leg link is a joint that connects the thigh frame of the leg link and the receiving portion in such a way that the leg link is free to swing at least in the forward/backward direction with the predetermined point as a swing central point.

10. A walking assistance device according to claim 8, wherein the first joint of each leg link is a joint that connects the thigh frame of the leg link and the receiving portion in such a way that the leg link is free to swing in the forward/backward direction and in the left/right direction and wherein at least the forward/backward swing central point of the leg link is located above the receiving portion as the predetermined point.

11. A walking assistance device according to claim 8, wherein the actuator for the left and the actuator for the right are connected to the thigh frames at places closer to the receiving portion than the second joints, respectively, and wherein the walking assistance device further comprises a pair of left and right power transmission elements configured to transmit driving forces of the actuators to the second joints, respectively.

12. A controller for a walking assistance device, the walking assistance device having: a receiving portion configured to be disposed between the root of both legs of a user so as to receive a part of the weight of the user from above; a pair of left and right thigh frames respectively connected to the receiving portion through first joints; a pair of left and right crus frames respectively connected to the thigh frames through second joints; a pair of left and right foot attachment portions that are respectively connected to the crus frames through third joints and respectively attached to the feet of the left and right legs of the user and that come in contact with the ground when the legs of the user are standing legs; an actuator for the left which drives the second joint among the joints of a left leg link composed of the first joint, the thigh frame, the second joint, the crus frame, the third joint, and the foot attachment portion on the left side; and an actuator for the right which drives the second joint among the joints of a right leg link composed of the first joint, the thigh frame, the second joint, the crus frame, the third joint, and the foot attachment portion on the right side; the second joints of the leg links being driven by the actuators so that upward lifting forces are applied to the user from the receiving portion, wherein:

each leg link is connected to the receiving portion so that a line of action of a supporting force applied to the crus frame from the third joint of the leg link corresponding to a standing leg passes through a predetermined point located upper than the receiving portion within the anteroposterior width of a contact surface between the receiving portion and the user from the third joint, when the leg link is viewed in the sagittal plane of the user; and the walking assistance device comprises means which applies the lifting forces to the user by controlling the actuators so that forces to be controlled reach predetermined desired values for the respective leg links with the supporting forces as the forces to be controlled, wherein the controller comprises:

treading force measuring element configured to measure a treading force of each leg of the user on the basis of a force detected value indicated by an output of a first force sensor provided in each of the foot attachment portions;

a second force sensor which is inserted between a lower end of the crus frame of each leg link and the third joint thereof or between the third joint of each leg link and the foot attachment portion thereof;

force-to-be-controlled measuring element configured to measure the supporting force actually applied to the crus frame from the third joint of each leg link as a force to be controlled on the basis of the force detected value indicated by an output of the second force sensor;

desired assist ratio setting element configured to set a desired assist ratio which is a desired value of a ratio of a force to be assisted by the walking assistance device out of the total treading force which is the total sum of the treading forces of the legs of the user with respect to the total treading force;

desired lifting force share determining element configured to determine a desired lifting force share that is a desired value of a share for the left leg link and a desired lifting force share that is a desired value of a share for the right leg link out of the upward lifting forces to be applied to the user from the receiving portion by multiplying the treading forces of the respective legs of the user by the desired assist ratio;

distribution element configured to determine a share for the left leg link and a share for the right leg link out of the supporting force as desired device supporting force shares for the respective leg links by distributing a supporting force for supporting the weight, which is obtained by subtracting the total weight of the portions below the second force sensor out of the walking assistance device from the weight of the entire walking assistance device on the floor, or a supporting force for supporting the weight of the entire walking assistance device on the floor to the leg links according to the ratio between the treading force of the left leg of the user and the treading force of the right leg of the user;

force-to-be-controlled desired value determining element configured to determine a total sum of the desired lifting force share for the left leg link and the desired device supporting force share therefor as a desired value of the force to be controlled of the left leg link and determines a total sum of the desired lifting force share for the right leg link and the desired device supporting force share therefor as a desired value of the force to be controlled of the right leg link; and actuator control element configured to control the actuator for the left so that a difference between the force to be controlled for the left leg link and the desired value therefor approaches zero on the basis of the force to be controlled for the left leg link and the desired value of the force to be controlled for the left leg link and which controls the actuator for the right so that a difference between the force to be controlled for the right leg link and the desired value therefor approaches zero on the basis of the force to be controlled for the right leg link and the desired value of the force to be controlled for the right leg link.

* * * * *